United States Patent
Sundberg et al.

(10) Patent No.: US 11,552,739 B2
(45) Date of Patent: Jan. 10, 2023

(54) IDENTIFICATION OF HYBRID ARQ (HARQ ID) AND REPETITION WINDOW FOR AUTONOMOUS REPEATED UPLINK TRANSMISSIONS

(71) Applicant: Telefonaktiebolaget LM Ericsson (publ), Stockholm (SE)

(72) Inventors: Mårten Sundberg, Årsta (SE); John Walter Diachina, Garner, NC (US); Gustav Wikström, Täby (SE); Zhenhua Zou, Solna (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 0 days.

(21) Appl. No.: 16/975,866

(22) PCT Filed: Apr. 2, 2019

(86) PCT No.: PCT/SE2019/050303
§ 371 (c)(1),
(2) Date: Aug. 26, 2020

(87) PCT Pub. No.: WO2019/194730
PCT Pub. Date: Oct. 10, 2019

(65) Prior Publication Data
US 2021/0014003 A1  Jan. 14, 2021

Related U.S. Application Data

(60) Provisional application No. 62/653,053, filed on Apr. 5, 2018.

(51) Int. Cl.
*H04L 1/08* (2006.01)
*H04L 1/18* (2006.01)
*H04L 5/00* (2006.01)

(52) U.S. Cl.
CPC .............. *H04L 1/08* (2013.01); *H04L 1/1896* (2013.01); *H04L 5/0048* (2013.01)

(58) Field of Classification Search
CPC ... H04L 27/261; H04L 5/0051; H04L 1/1822; H04L 1/1893; H04L 1/08; H04L 1/1861;
(Continued)

(56) References Cited

U.S. PATENT DOCUMENTS

2012/0182959 A1* 7/2012 Kwon ................. H04L 27/0012
370/329
2012/0281656 A1* 11/2012 Hooli ..................... H04J 13/22
370/329
(Continued)

FOREIGN PATENT DOCUMENTS

| WO | 2011093650 A2 | 8/2011 |
| WO | 2019030683 A1 | 2/2019 |
| WO | 2019160464 A1 | 8/2019 |

OTHER PUBLICATIONS

"Repetition Enhancements for UL SPS Operation", 3GPP TSG RAN WG1 Meeting #93; R1-1805868; Busan, Korea, May 21-25, 2018, pp. 1-6.
(Continued)

*Primary Examiner* — Yee F Lam
(74) *Attorney, Agent, or Firm* — Christopher & Weisberg, P.A.

(57) ABSTRACT

Embodiments include methods for a user equipment (UE) to transmit control information in association with a plurality of data packet repetitions. Such methods include selecting, from a plurality of configured starting transmit positions, a starting transmit position for an initial repetition of the plurality. Such methods include selecting a sequence of cyclic shift (CS) values from a plurality of configured CS values. The plurality of configured CS values are less than the plurality of repetitions and/or the plurality of configured
(Continued)

starting transmit positions. The sequence is selected based on the plurality of repetitions, and on an identifier associated with the data packet and/or the selected starting transmit position. Such methods include transmitting the data packet repetitions beginning at the starting transmit position, wherein at least a subset of the repetitions are transmitted in association with demodulation reference signals (DMRS) that are cyclic-shifted according to CS values of the selected sequence.

10 Claims, 14 Drawing Sheets

(58) Field of Classification Search
CPC ... H04L 1/1854; H04L 1/0038; H04L 1/1812; H04W 72/1278; H04J 13/0062
See application file for complete search history.

(56) References Cited

U.S. PATENT DOCUMENTS

| | | | |
|---|---|---|---|
| 2013/0083769 A1* | 4/2013 | Qu | H04L 5/0023 370/335 |
| 2014/0078972 A1* | 3/2014 | Sorrentino | H04J 13/0074 370/329 |
| 2015/0009948 A1* | 1/2015 | Raaf | H04W 88/02 370/330 |
| 2016/0337103 A1* | 11/2016 | Kim | H04W 72/0446 |
| 2017/0245313 A1 | 8/2017 | Kim et al. | |
| 2018/0102915 A1* | 4/2018 | Rico Alvarino | H04W 72/042 |
| 2018/0176945 A1* | 6/2018 | Cao | H04L 5/0044 |
| 2018/0206246 A1* | 7/2018 | Zhang | H04W 72/085 |
| 2018/0279327 A1* | 9/2018 | Ying | H04W 72/0446 |
| 2019/0103945 A1* | 4/2019 | Medles | H04L 27/261 |
| 2020/0107317 A1* | 4/2020 | Ryu | H04L 5/0048 |

OTHER PUBLICATIONS

"Summary on HRLLC UL DMRS sharing", 3GPP TSG RAN WG1 Meeting #93; R1-1807521; Busan, Korea, May 21-25, 2018, pp. 1-2.
"UL SPS PUSCH performance and HARQ ambiguity resolution", 3GPP TSG-RAN WG1 Meeting #92b; R1-1805163; Sanya, China, Apr. 16-20, 2018, pp. 1-6.
"3GPP TS 36.211 V15.0.0", 3rd Generation Partnership Project; Technical Specification Group Radio Access Network; Evolved Universal Terrestrial Radio Access (E-UTRA); Physical channels and modulation (Release 15), Dec. 2017, pp. 1-219.
"3GPP TS 36.213 V15.0.0", 3rd Generation Partnership Project; Technical Specification Group Radio Access Networ;k Evolved Universal Terrestrial Radio Access (E-UTRA); Physical layer procedures (Release 15), Dec. 2017, pp. 1-493.
EPO Communication and Search Report dated Nov. 17, 2021 for Patent Application No. 19780550.0, consisting at 7-pages.
3GPP TSG RAN WG2 Meeting 100 R2-1713173; Title: Summary of [99bis#41 ] [NR UP/MAC] Open Issues on SPS and GF-Huawei; Agenda Item: 10.3.1.8; Source: Huawei; Document for: Discussion and Decision; Date and Location: Nov.-Dec. 1, 2017, Reno, United States, consisting of 57-pages.
3GPP TSG RAN WG2 Meeting 101 R2-1802212; Title: [NR-AH1801#15] [NR UP/MAC] Repetition aspects-Huawei Agenda Item: 10.3.1.8; Source: Huawei, HiSilicon; Document for: Discussion and Decision; Date and Location: Feb. 26-Mar. 2, 2018, Athens, Greece, consisting of 22-pages.

* cited by examiner

IDENTIFICATION OF HYBRID ARQ (HARQ ID) AND REPETITION WINDOW FOR AUTONOMOUS REPEATED UPLINK TRANSMISSIONS

TECHNICAL FIELD

The present invention generally relates to wireless communication networks, and particularly relates to efficient signaling techniques for conveying control information associated with autonomous repeated uplink (UL) transmissions from a wireless device to a network node.

BACKGROUND

Long Term Evolution (LTE) is an umbrella term for so-called fourth-generation (4G) radio access technologies developed within the Third-Generation Partnership Project (3GPP) and initially standardized in Releases 8 and 9, also known as Evolved UTRAN (E-UTRAN). LTE is targeted at various licensed frequency bands and is accompanied by improvements to non-radio aspects commonly referred to as System Architecture Evolution (SAE), which includes Evolved Packet Core (EPC) network. LTE continues to evolve through subsequent releases. One of the features of Release 11 is an enhanced Physical Downlink Control Channel (ePDCCH), which has the goals of increasing capacity and improving spatial reuse of control channel resources, improving inter-cell interference coordination (ICIC), and supporting antenna beamforming and/or transmit diversity for control channel.

An overall exemplary architecture of a network comprising LTE and SAE is shown in FIG. 1. E-UTRAN 100 comprises one or more evolved Node B's (eNB), such as eNBs 105, 110, and 115, and one or more user equipment (UE), such as UE 120. As used within the 3GPP standards, "user equipment" or "UE" means any wireless communication device (e.g., smartphone or computing device) that is capable of communicating with 3GPP-standard-compliant network equipment, including E-UTRAN as well as UTRAN and/or GERAN, as the third- ("3G") and second-generation ("2G") 3GPP radio access networks are commonly known.

As specified by 3GPP, E-UTRAN 100 is responsible for all radio-related functions in the network, including radio bearer control, radio admission control, radio mobility control, scheduling, and dynamic allocation of resources to UEs in uplink and downlink, as well as security of the communications with the UE. These functions reside in the eNBs, such as eNBs 105, 110, and 115. The eNBs in the E-UTRAN communicate with each other via the X1 interface, as shown in FIG. 1. The eNBs also are responsible for the E-UTRAN interface to the EPC, specifically the S1 interface to the Mobility Management Entity (MME) and the Serving Gateway (SGW), shown collectively as MME/S-GWs 134 and 138 in FIG. 1. Generally speaking, the MME/S-GW handles both the overall control of the UE and data flow between the UE and the rest of the EPC. More specifically, the MME processes the signaling protocols between the UE and the EPC, which are known as the Non-Access Stratum (NAS) protocols. The S-GW handles all Internet Procotol (IP) data packets between the UE and the EPC, and serves as the local mobility anchor for the data bearers when the UE moves between eNBs, such as eNBs 105, 110, and 115.

FIG. 2A shows a high-level block diagram of an exemplary LTE architecture in terms of its constituent entities—UE, E-UTRAN, and EPC—and high-level functional division into the Access Stratum (AS) and the Non-Access Stratum (NAS). FIG. 2A also illustrates two particular interface points, namely Uu (UE/E-UTRAN Radio Interface) and S1 (E-UTRAN/EPC interface), each using a specific set of protocols, i.e., Radio Protocols and S1 Protocols. Each of the two protocols can be further segmented into user plane (or "U-plane") and control plane (or "C-plane") protocol functionality. On the Uu interface, the U-plane carries user information (e.g., data packets) while the C-plane is carries control information between UE and E-UTRAN.

FIG. 2B illustrates a block diagram of an exemplary C-plane protocol stack on the Uu interface comprising Physical (PHY), Medium Access Control (MAC), Radio Link Control (RLC), Packet Data Convergence Protocol (PDCP), and Radio Resource Control (RRC) layers. The PHY layer is concerned with how and what characteristics are used to transfer data over transport channels on the LTE radio interface. The MAC layer provides data transfer services on logical channels, maps logical channels to PHY transport channels, and reallocates PHY resources to support these services. The RLC layer provides error detection and/or correction, concatenation, segmentation, and reassembly, reordering of data transferred to or from the upper layers. The PHY, MAC, and RLC layers perform identical functions for both the U-plane and the C-plane. The PDCP layer provides ciphering/deciphering and integrity protection for both U-plane and C-plane, as well as other functions for the U-plane such as header compression.

FIG. 2C shows a block diagram of an exemplary LTE radio interface protocol architecture from the perspective of the PHY. The interfaces between the various layers are provided by Service Access Points (SAPs), indicated by the ovals in FIG. 2C. The PHY layer interfaces with the MAC and RRC protocol layers described above. The MAC provides different logical channels to the RLC protocol layer (also described above), characterized by the type of information transferred, whereas the PHY provides a transport channel to the MAC, characterized by how the information is transferred over the radio interface. In providing this transport service, the PHY performs various functions including error detection and correction; rate-matching and mapping of the coded transport channel onto physical channels; power weighting, modulation; and demodulation of physical channels; transmit diversity, beamforming multiple input multiple output (MIMO) antenna processing; and providing radio measurements to higher layers, such as RRC.

Downlink (i.e., eNB to UE) physical channels provided by the LTE PHY include Physical Downlink Shared Channel (PDSCH), Physical Multicast Channel (PMCH), Physical Downlink Control Channel (PDCCH), Relay Physical Downlink Control Channel (R-PDCCH), Physical Broadcast Channel (PBCH), Physical Control Format Indicator Channel (PCFICH), and Physical Hybrid ARQ Indicator Channel (PHICH). In addition, the LTE PHY downlink includes various reference signals, synchronization signals, and discovery signals.

Uplink (i.e., UE to eNB) physical channels provided by the LTE PHY include Physical Uplink Shared Channel (PUSCH), Physical Uplink Control Channel (PUCCH), and Physical Random Access Channel (PRACH). In addition, the LTE PHY uplink includes various reference signals including demodulation reference signals (DM-RS), which are transmitted to aid the eNB in the reception of an associated PUCCH or PUSCH; and sounding reference signals (SRS), which are not associated with any uplink channel.

The multiple access scheme for the LTE PHY is based on Orthogonal Frequency Division Multiplexing (OFDM) with a cyclic prefix (CP) in the downlink, and on Single-Carrier Frequency Division Multiple Access (SC-FDMA) with a cyclic prefix in the uplink. To support transmission in paired and unpaired spectrum, the LTE PHY supports both Frequency Division Duplexing (FDD) (including both full- and half-duplex operation) and Time Division Duplexing (TDD). FIG. 3A shows an exemplary radio frame structure ("type 1") used for LTE FDD downlink (DL) operation. The DL radio frame has a fixed duration of 10 ms and consists of 20 slots, labeled 0 through 19, each with a fixed duration of 0.5 ms. A 1-ms subframe comprises two consecutive slots where subframe i consists of slots 2i and 2i+1. Each exemplary FDD DL slot consists of $N^{DL}_{symb}$ OFDM symbols, each of which is comprised of $N_{sc}$ OFDM subcarriers. Exemplary values of $N^{DL}_{symb}$ can be 7 (with a normal CP) or 6 (with an extended-length CP) for subcarrier bandwidth of 15 kHz. The value of $N_{sc}$ is configurable based upon the available channel bandwidth. Since persons of ordinary skill in the art are familiar with the principles of OFDM, further details are omitted in this description.

As shown in FIG. 3A, a combination of a particular subcarrier in a particular symbol is known as a resource element (RE). Each RE is used to transmit a particular number of bits, depending on the type of modulation and/or bit-mapping constellation used for that RE. For example, some REs may carry two bits using QPSK modulation, while other REs may carry four or six bits using 16- or 64-QAM, respectively. The radio resources of the LTE PHY are also defined in terms of physical resource blocks (PRBs). A PRB spans $N^{RB}_{sc}$ sub-carriers over the duration of a slot (i.e., $N^{DL}_{symb}$ symbols), where $N^{RB}_{sc}$ is typically either 12 (with a 15-kHz sub-carrier bandwidth) or 24 (7.5-kHz bandwidth). A PRB spanning the same $N^{RB}_{sc}$ subcarriers during an entire 1-ms subframe (i.e., $2N^{DL}_{symb}$ symbols or two slots) is known as a PRB pair.

Accordingly, the resources available in a subframe of the LTE PHY DL comprise $N^{DL}_{RB}$ PRB pairs, each of which comprises $2N^{DL}_{symb} \cdot N^{RB}_{sc}$ REs. For a normal CP and 15-KHz sub-carrier bandwidth, a PRB pair comprises 168 REs. These resources are scheduled or allocated on a per-subframe basis, such that the 1-ms subframe duration is also referred to as a transmission time interval (TTI).

One exemplary characteristic of PRBs is that consecutively numbered PRBs (e.g., $PRB_i$ and $PRB_{i+1}$) comprise consecutive blocks of subcarriers. For example, with a normal CP and 15-KHz sub-carrier bandwidth, $PRB_0$ comprises sub-carrier 0 through 11 while $PRB_1$ comprises sub-carriers 12 through 23. The LTE PHY resource also can be defined in terms of virtual resource blocks (VRBs), which are the same size as PRBs but may be of either a localized or a distributed type. Localized VRBs can be mapped directly to PRBs such that VRB $n_{VRB}$ corresponds to PRB $n_{PRB} = n_{VRB}$. On the other hand, distributed VRBs may be mapped to non-consecutive PRBs according to various rules, as described in 3GPP Technical Specification (TS) 36.213 or otherwise known to persons of ordinary skill in the art. However, the term "PRB" shall be used in this disclosure to refer to both physical and virtual resource blocks. Moreover, the term "PRB" will be used henceforth to refer to a resource block for the duration of a subframe, i.e., a PRB pair, unless otherwise specified.

FIG. 3B shows an exemplary LTE FDD uplink (UL) radio frame configured in a similar manner as the exemplary FDD DL radio frame shown in FIG. 3A. Using terminology consistent with the above DL description, each UL slot consists of $N^{UL}_{symb}$ OFDM symbols, each of which is comprised of $N_{sc}$ OFDM subcarriers.

As discussed above, the LTE PHY maps the various DL and UL physical channels to the resources shown in FIGS. 3A and 3B, respectively. For example, the PHICH carries HARQ feedback (e.g., ACK/NAK) for UL transmissions by the UEs. Similarly, PDCCH carries scheduling assignments, channel quality feedback (e.g., CSI) for the UL channel, and other control information. Likewise, a PUCCH carries uplink control information such as scheduling requests, CSI for the downlink channel, HARQ feedback for eNB DL transmissions, and other control information. Both PDCCH and PUCCH can be transmitted on aggregations of one or several consecutive control channel elements (CCEs), and a CCE is mapped to the physical resource based on resource element groups (REGs), each of which is comprised of a plurality of REs. For example, a CCE can comprise nine (9) REGs, each of which can comprise four (4) REs.

In LTE, DL transmissions are dynamically scheduled, i.e., in each subframe the base station transmits control information indicating the terminal to which data is transmitted and upon which resource blocks the data is transmitted, in the current downlink subframe. This control signaling is typically transmitted in the first n OFDM symbols in each subframe and the number n (=1, 2, 3 or 4) is known as the Control Format Indicator (CFI) indicated by the PCFICH transmitted in the first symbol of the control region.

FIG. 4 illustrates one exemplary manner in which the CCEs and REGs can be mapped to the physical resource, i.e., PRBs. As shown in FIG. 4, the REGs comprising the CCEs of the PDCCH can be mapped into the first three symbols (e.g., CFI=3) of a subframe, whereas the remaining symbols are available for other physical channels, such as the PDSCH which carries user data. In Release-8 configurations, one such portion of the DL transmission is referred to as a Transmit Time Interval (TTI). Each of the REGs comprises four REs, which are represented by the small, dashed-line rectangles. Since QPSK modulation is used for the PDCCH, in the exemplary configuration of FIG. 4, each REG comprises eight (8) bits and each CCE comprises 72 bits. Although two CCEs are shown in FIG. 4, the number of CCEs may vary depending on the required PDCCH capacity, determined by number of users, amount of measurements and/or control signaling, etc. Moreover, other ways of mapping REGs to CCEs will be apparent to those of ordinary skill in the art. On the uplink, PUCCH can be configured similarly, except that the number of bits per CCE varies because PUCCH uses either QPSK or BPSK depending on particular message contents.

Beginning with Release 11, the 3GPP specifications include an enhanced PDCCH (ePDCCH) in addition to the legacy PDCCH described above. The ePDCCH is intended to increase capacity and improve spatial reuse of control channel resources, improve inter-cell interference coordination (ICIC), and add antenna beamforming and/or transmit diversity support for control channel. Much like the Release 8 PDCCH, the ePDCCH is constructed by aggregating one or more enhanced control channel elements (eCCEs). An eCCE is comprised of one or more enhanced resource element groups (eREGs), each of which is comprised of one or more REs. For example, an eCCE comprised of nine eREGs, each having four REs, may be configured with the same capacity as a CCE. Unlike CCEs, however, eCCEs may be flexibly configured with various numbers and sizes of eREGs.

Moreover, the ePDCCH (i.e., eCCEs) can be mapped to PRBs for transmission either in a localized or distributed manner. The localized mapping provides frequency selective scheduling gain and beamforming gain while the distributed transmission provides robust ePDCCH transmission via frequency diversity in case valid channel state information is not available to the receiver. In order to achieve sufficient frequency diversity, however, each eCCE must be mapped to a minimum number PRBs distributed sufficiently throughout the range of sub-carriers in the physical resource.

A DL subframe also contains common reference symbols (CRS), which are known to the receiver and used for coherent demodulation of, e.g., control information. FIG. 5 shows an exemplary DL subframe with CFI=3 OFDM symbols arranged for control information (e.g., similar to FIG. 4), along with CRS distributed through the subframe in an exemplary manner.

As mentioned above, other DL reference signals can be UE-specific, such as DM-RS that can facilitate particular UEs to coherently demodulate data or control information transmitted to those UEs. Similarly, DM-RS can be transmitted in conjunction with PUCCH and/or PUSCH on the LTE UL. When DM-RS is transmitted in conjunction with PUSCH, the DMRS occupies a full UL symbol (i.e., all subcarriers). The DMRS transmitted in both UL and DL are designed so that a sequence can be cyclically shifted using different cyclic shifts (CSs). Different cyclic shifts are orthogonal to each other (under certain conditions) and can be used to separate users by the receiver (by detecting the CS of the DMRS, in case multiple CSs have been allocated). As defined in 3GPP TS 36.211, a reference signal (e.g., DMRS) sequence $r_{u,v}^{(\alpha)}(n)$ can be defined by a cyclic shift $\alpha$ of a base sequence $\bar{r}_{u,v}(n)$ according to $$r_{u,v}^{(\alpha)}(n)=e^{j\alpha n}\bar{r}_{u,v}(n), 0\leq n<M_{sc}^{RS}$$

where $M_{sc}^{RS}=mN_{sc}^{RB}$ is the length of the reference signal sequence and $1\leq m\leq N_{RB}^{max,UL}$. Multiple RS sequences can be defined from a base sequence and different values of $\alpha$.

One feature targeted for LTE Release 15 is shorter transmission time intervals (TTIs), also referred to as "short TTI." With this feature, transmissions can be made with a shorter duration (e.g., as little as one-seventh of the length of a normal LTE TTI). Each of these short transmissions can be scheduled separately with a new DL in-band control channel, with feedback sent in a new UL control channel. The scheduling and feedback can be sent in adjacent subframes for the shortest transmission time, resulting in a total radio access one-way transmission delay of about 0.5 ms, including data processing time. To support short TTI, the concept of a "subslot" is defined to include either two or three OFDM symbols, shorter than the seven-symbol duration of a slot. The varying length of the subslot is due to the need to have an integer split of 14-symbol subframes without crossing boundaries of the seven-symbol slots. With respect to the exemplary subframes shown in FIGS. 4 and 5, the second slot will have more resources available for data than the first slot due to the PDCCH region in the beginning of the first slot.

The DL subslot pattern is dependent on the first symbol in the DL available to map PDSCH to, while the UL subslot pattern is fixed. An exemplary arrangement of UL and DL subslots is shown in FIG. 6. The subslot numbering in each subframe is denoted 0 to 5. In DL subframes where there are only be 5 subslots available for data transmission, the subslot number is defined from 1 to 5).

Transmissions can take place with or without an explicit grant/assignment. In case of UL, the transmission is usually referred to as being "granted by the network" (i.e., "UL grant"), while on the DL the transmission is referred to as taking place on a "DL assignment." In case of a transmission with an explicit grant/assignment, a control message is sent to the UE informing it of the specific radio resources to be used for the transmission. In contrast, a transmission without an explicit grant/assignment is typically configured to occur with a defined periodicity. Given a recurring UL and/or DL configuration, the UE can then initiate a data transmission and/or receive data according to a predefined configuration. Such transmissions can be referred to as semi-persistent scheduling (SPS), configured grant, or grant-free transmissions. In general, however, when referring to an UL transmission without an explicit grant as a "configured grant transmission," this term can include all types of pre-configured transmission patterns, including both SPS and grant-free operation.

To increase the reliability of a transmission, multiple repetitions of the same data packet (transport block, TB) can be configured and/or used. Using repetitions is a simple way to improve coverage and/or increase reliability, since the receiver can combine the multiple transmissions and achieve processing gain as well as a potential diversity gain. As used herein, a "repetition" refers generally to a particular version of a data packet payload that can be transmitted during some selected time interval. As such, different "repetitions" of the same data packet need not be identical but can, for example, utilize a different puncturing scheme and/or redundancy version of encoded bits for each repetition. Moreover, an initially-transmitted version of a data packet can also be considered a "repetition" or, more specifically, an "initial repetition."

Combining UL configured grant transmission with data packet repetitions has the potential to improve reliability and/or reduce latency compared to a grant-based transmission. However, the actual improvements to latency can vary significantly depending on how the transmissions/repetitions are performed. Moreover, some techniques that improve latency can create difficulties in distinguishing between overlapping transmissions of different data packets (e.g., from different senders), which can lead to data packet decoding errors.

SUMMARY

Embodiments of the present disclosure provide specific improvements to communication between user equipment (UE) and network nodes in a wireless communication network, such as by facilitating solutions to overcome the exemplary problems described above. More specifically, exemplary embodiments can provide an efficient technique for a UE to implicitly signal a starting transmit position of repetitions of a UL data packet, as well as an identifier (e.g., HARQ process ID) associated with the data packet. By encoding such information in a sequence of cyclic shifts (CS) associated with demodulation reference signals (DMRS) and transmitting these DMRS in association with at least a portion of the data packet repetitions, the UE can efficiently convey such uplink control information to the network node without incurring additional signaling (e.g., PUCCH) overhead. In this manner, exemplary embodiments of the present disclosure provide specific improvements that facilitate reduced latency of data packet repetitions while efficiently utilizing scarce uplink signaling resources.

Exemplary embodiments of the present disclosure include methods and/or procedures for transmitting control information, to a network node in a wireless communication network, in association with a plurality of repetitions of a data packet. The exemplary methods and/or procedures can be performed by a user equipment (UE, or component of a UE, such as a modem) in communication with the network node (e.g., base station, eNB, gNB, ng-eNB, en-gNB, etc., or components thereof).

The exemplary methods and/or procedures can include selecting a starting transmit position for an initial repetition of the plurality of repetitions of the data packet. The plurality of repetitions can include an initial repetition and one or more further repetitions including, e.g., a final repetition. The starting transmit position can be selected from a plurality of configured starting transmit positions. In some exemplary embodiments, the starting transmit position can be selected to minimize latency of the data packet.

The exemplary methods and/or procedures can also include selecting a sequence of cyclic shift (CS) values from a plurality of configured CS values. The plurality of configured CS values can be less than at least one of the following: the plurality of repetitions, and the plurality of configured starting transmit positions. For example, there can be L=2 configured CS values and four (4) configured starting transmit positions, with one starting position selected for transmitting the K=4 repetitions of the data packet. In addition, the sequence can be selected based on the plurality of repetitions and at least one of the following: an identifier associated with the data packet, and the selected starting transmit position. In some embodiments, the identifier associated with the data packet comprises a hybrid ARQ process identifier (HARQ ID). In some embodiments, the number of different CS values used in the sequence can be less than the plurality of configured starting transmit positions.

The exemplary methods and/or procedures can also include transmitting the plurality of repetitions of the data packet beginning at the starting transmit position. In addition, at least a subset of the repetitions can be transmitted in association with respective DMRS that are cyclic-shifted according to corresponding CS values of the selected sequence. In some embodiments, at least one of the repetitions is transmitted without an associated DMRS, e.g., in a data-only subslot. In some embodiments, the plurality of repetitions can be transmitted in a corresponding plurality of consecutive intervals, where each configured starting transmit position is during one of the consecutive intervals. In some embodiments, the DMRS that is transmitted in association with each repetition is also phase-shifted by one of two phase-shift (PS) values.

Exemplary embodiments of the present disclosure also include methods and/or procedures for receiving control information from a user equipment (UE) in association with a plurality of repetitions of a data packet. The exemplary methods and/or procedures can be performed by a network node (e.g., base station, eNB, gNB, ng-eNB, en-gNB, etc., or component(s) thereof) in a wireless communication network.

The exemplary methods and/or procedures can include receiving, from the UE a plurality of repetitions of a data packet, the plurality including an initial repetition. In some embodiments, the plurality of repetitions can be received in a corresponding plurality of consecutive intervals, and each configured starting transmit position is during one of the consecutive intervals.

The exemplary methods and/or procedures can also include receiving, from the UE in association with of at least a portion of the plurality of repetitions, respective demodulation reference signals (DMRS) that are cyclic-shifted according to a sequence of cyclic shift (CS) values. Furthermore, each CS value can be one of a plurality of configured CS values, and the plurality of configured CS values can be less than at least one of the following: the plurality of repetitions, and a plurality of configured starting transmit positions for initial repetitions of data packets. For example, there can be L=2 configured CS values and four (4) configured starting transmit positions, with one starting position selected for transmitting the K=4 repetitions of the data packet. In some embodiments, the number of different CS values used in the sequence can be less than the plurality of configured starting transmit positions.

The exemplary methods and/or procedures can also include determining, based on the sequence of CS values, at least one of the following: an identifier associated with the data packet; and a starting transmit position at which the initial repetition was transmitted. In some exemplary embodiments, the identifier associated with the data packet comprises a hybrid ARQ process identifier (HARQ ID). In some embodiments, determining the starting transmit position can include determining that the respective CS shift values of the received DMRS substantially match a particular CS sequence associated with the starting transmit position.

Other exemplary embodiments include network nodes network nodes (e.g., base station, eNB, gNB, ng-eNB, en-gNB, etc., or component(s) thereof) or user equipment (e.g., UE or component of a UE, such as a modem) configured to perform operations corresponding to the exemplary methods and/or procedures described herein. Other exemplary embodiments include non-transitory, computer-readable media storing program instructions that, when executed by at least one processor, configure such network nodes or such UEs to perform operations corresponding to the exemplary methods and/or procedures described above.

These and other objects, features and advantages of the exemplary embodiments of the present disclosure will become apparent upon reading the following detailed description of the exemplary embodiments of the present disclosure.

BRIEF DESCRIPTION OF THE DRAWINGS

FIG. 8, which includes

DETAILED DESCRIPTION

As briefly mentioned above, combining configured grant UL transmissions without with data packet repetitions can improve reliability and/or reduce latency compared to a grant-based transmission. However, the actual improvements to latency can vary significantly depending on how the transmissions/repetitions are performed. Moreover, some techniques that can improve latency can create difficulties in distinguishing between overlapping transmissions of different data packets (e.g., from different senders or from a specific sender wherein one specific starting position of a plurality of configured starting transmit positions was selected for transmitting the initial repetition of a data packet), which can lead to packet decoding errors. This is discussed in more detail below.

Figure 1:
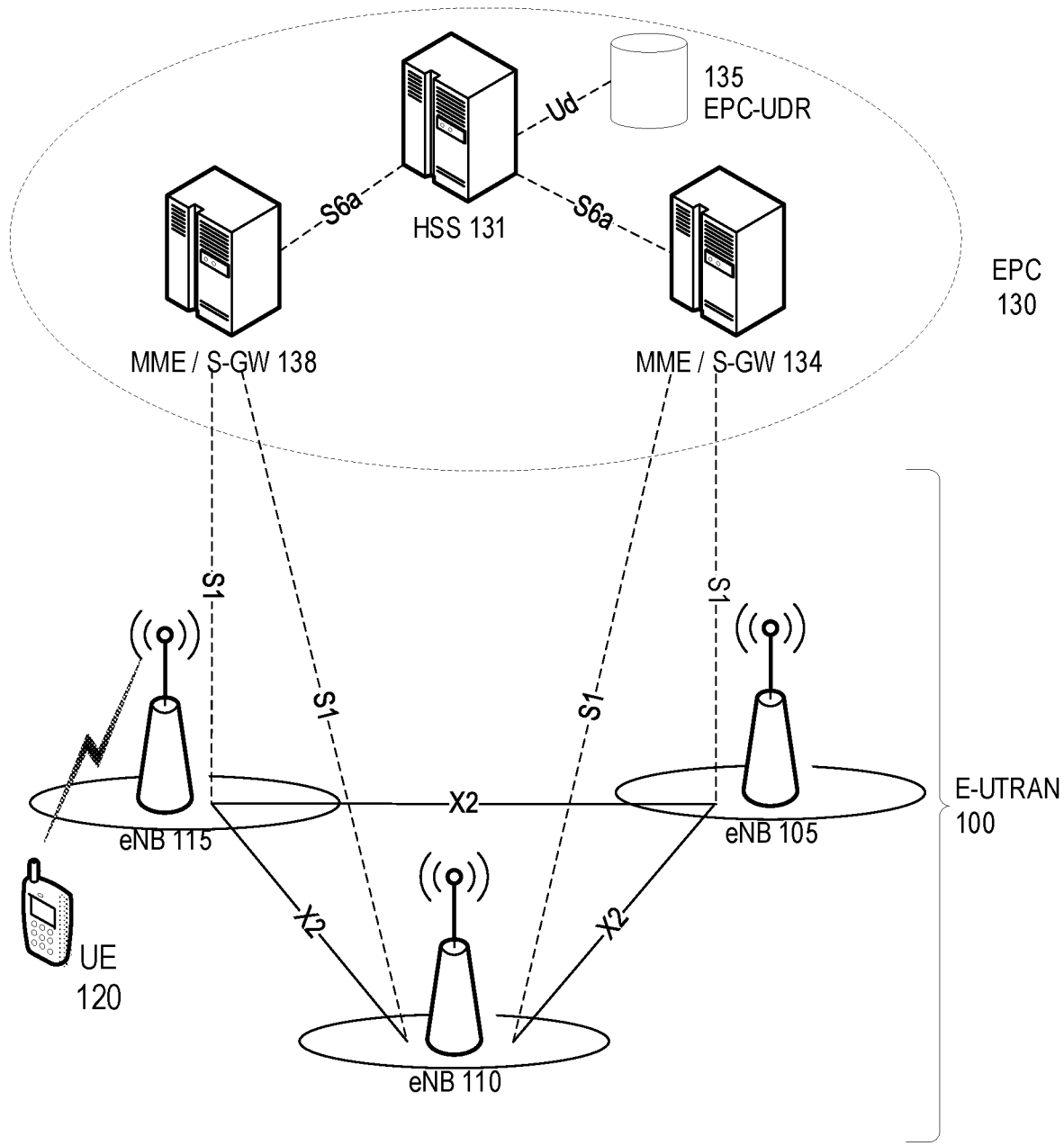
FIG. 1 is a high-level block diagram of an exemplary architecture of the Long-Term Evolution (LTE) Evolved UTRAN (E-UTRAN) and Evolved Packet Core (EPC) network, as standardized by 3GPP.
Figure 2A:
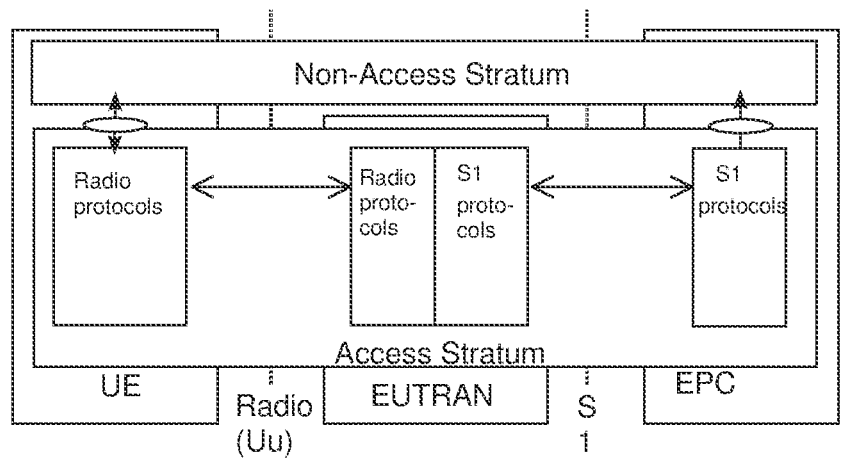
FIG. 2A is a high-level block diagram of an exemplary E-UTRAN architecture in terms of its constituent components, protocols, and interfaces.
Figure 2B:
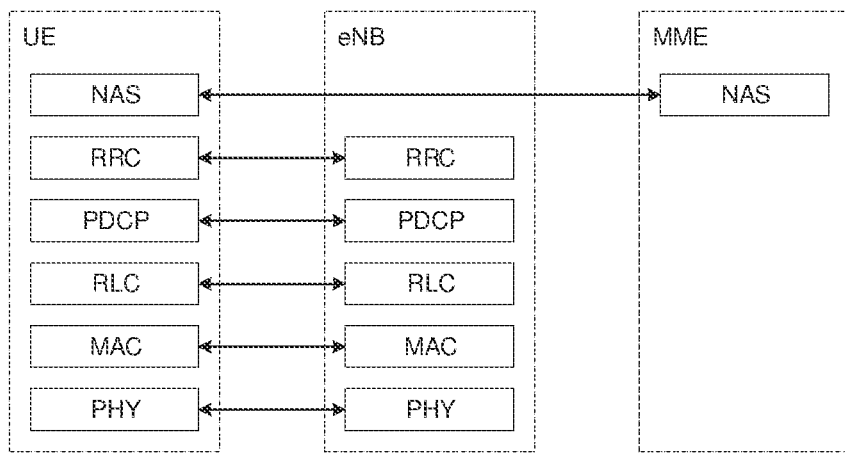
FIG. 2B is a block diagram of exemplary protocol layers of the control-plane portion of the radio (Uu) interface between a user equipment (UE) and the E-UTRAN.
Figure 2C:
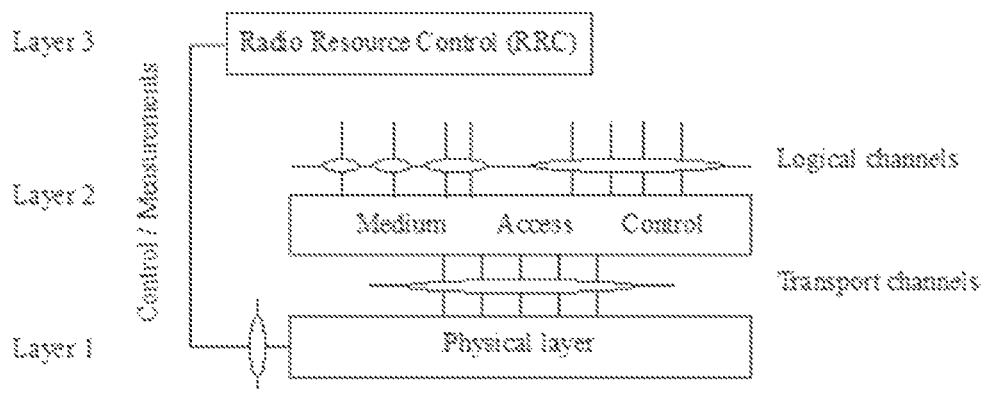
FIG. 2C is a block diagram of an exemplary LTE radio interface protocol architecture from the perspective of the PHY layer.
Figure 3A:
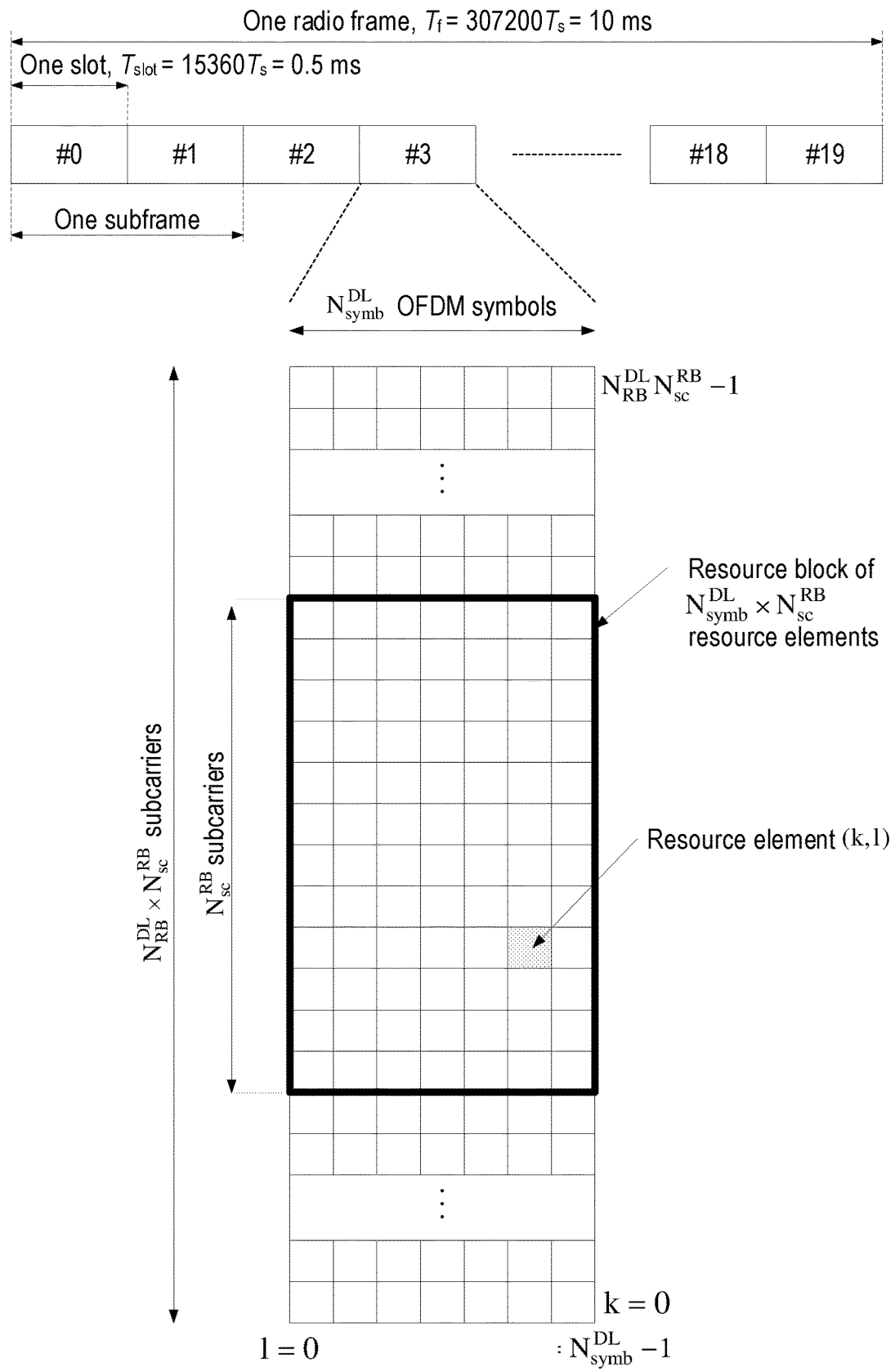
FIGS. 3A and 3B are block diagrams, respectively, of exemplary downlink and uplink LTE radio frame structures used for frequency division duplexing (FDD) operation.
Figure 3B:
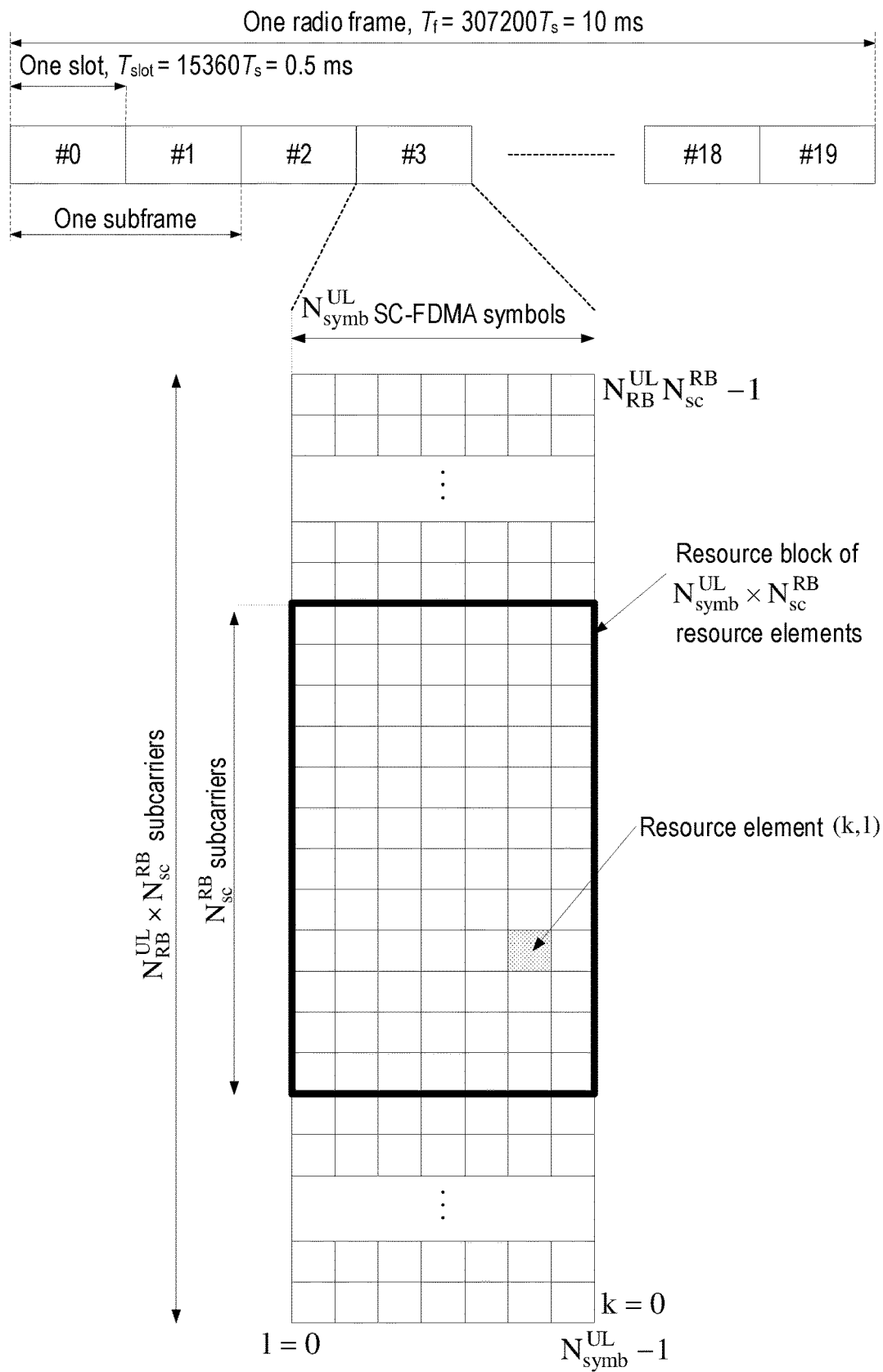
Figure 4:
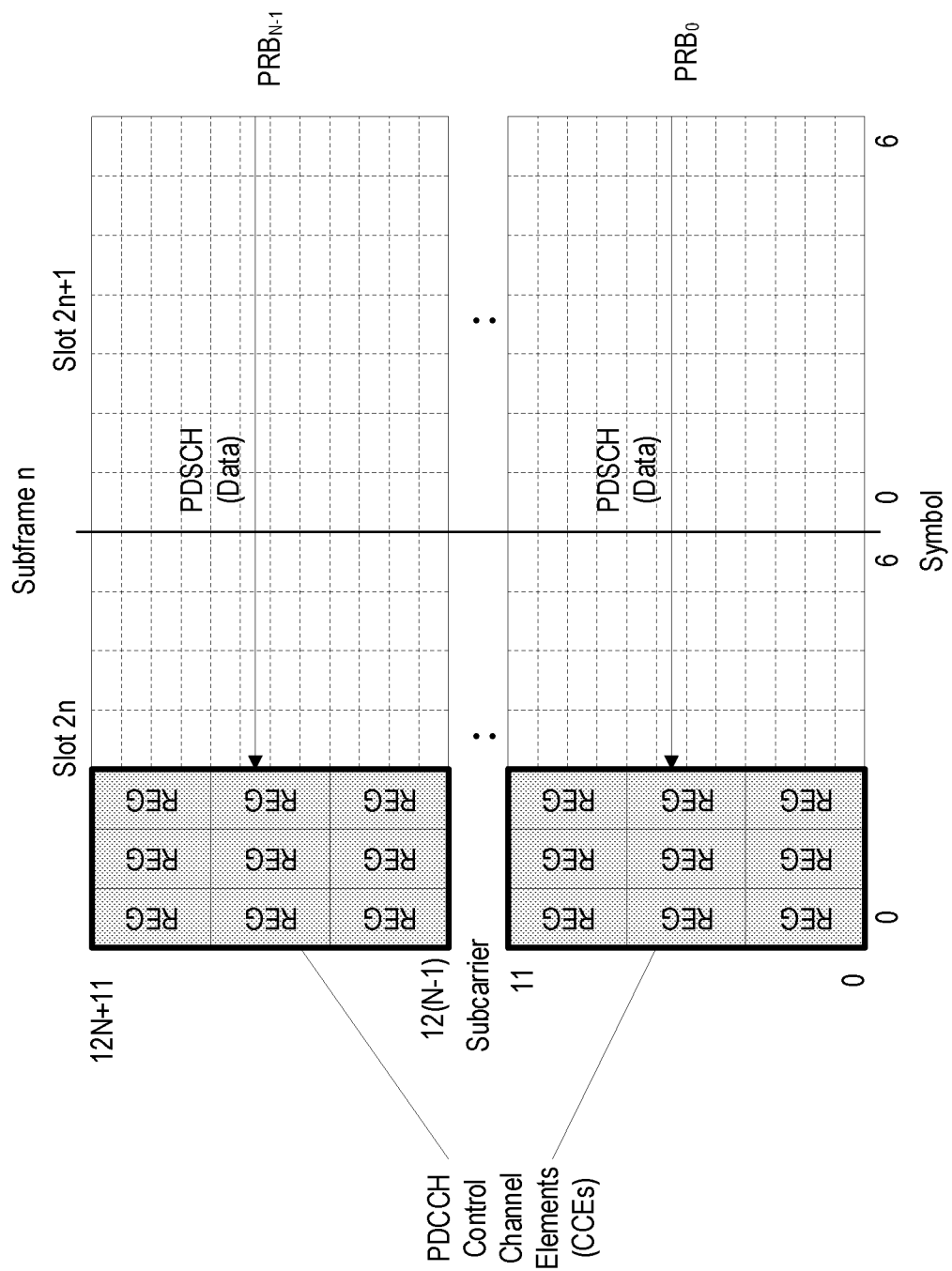
FIGS. 4-5 illustrate exemplary approaches for mapping control channel elements (CCEs) and resource element groups (REGs) for a PDCCH, together with a PDSCH and reference symbols, into LTE physical resource blocks (PRBs).
Figure 5:
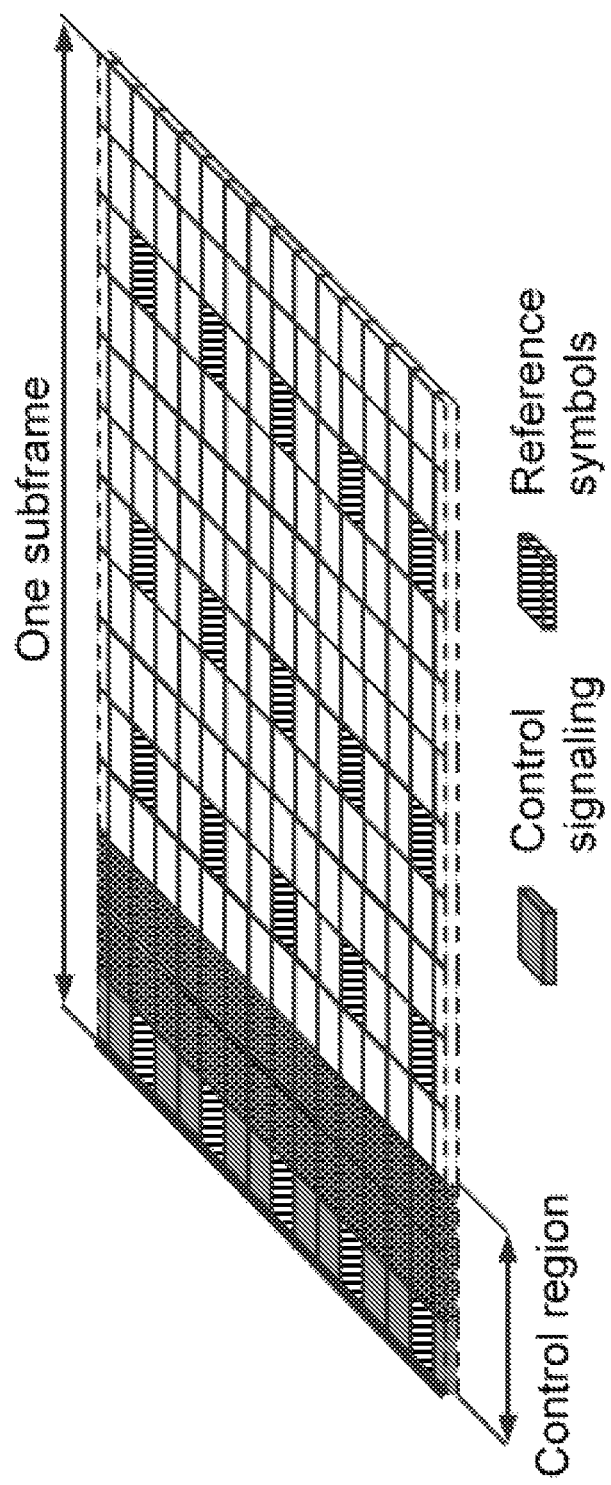
Figure 6:
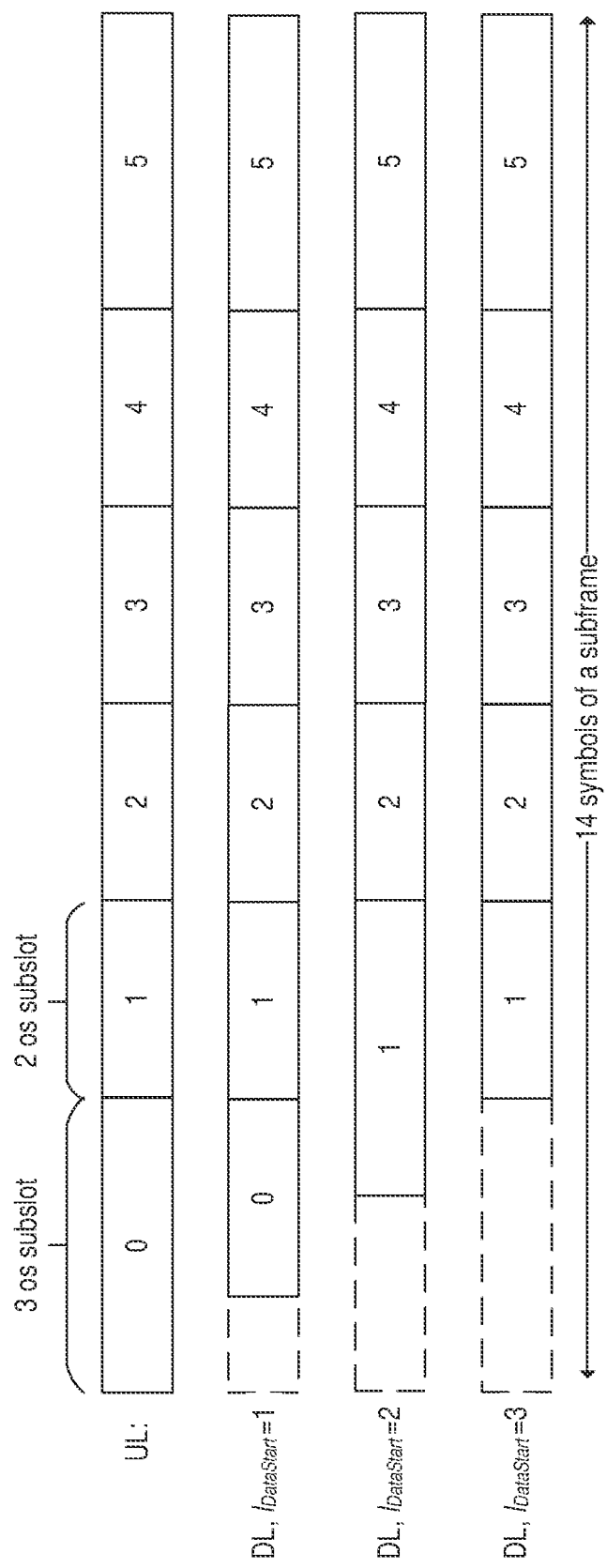
FIG. 6 illustrates exemplary arrangements of uplink and downlink subslots within an LTE subframe.
Figure 7:
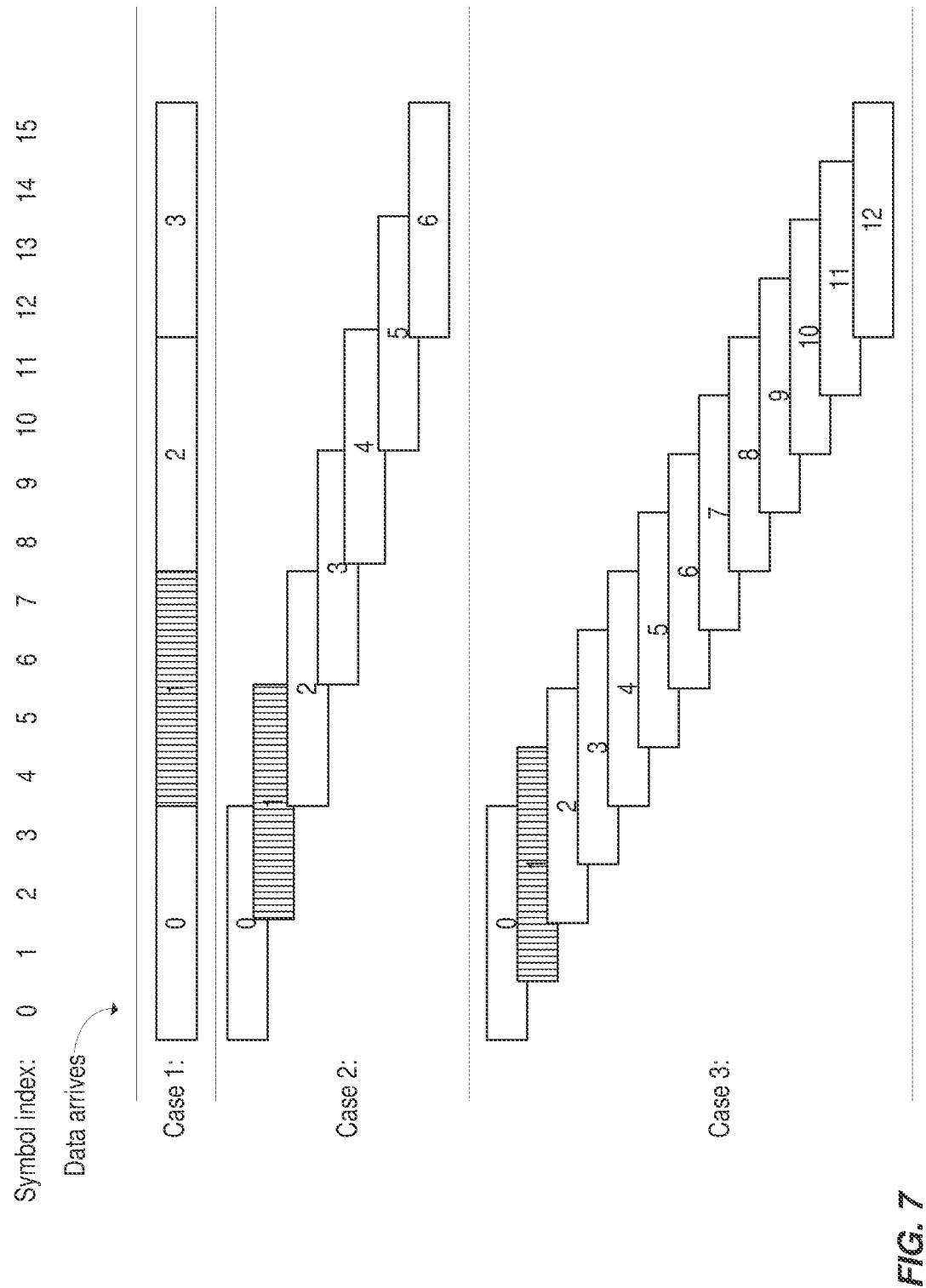
FIG. 7 illustrates three different overlapping arrangements between repetitions of a plurality of data packets, each having a transmission duration of four symbols, according to various exemplary embodiments of the present disclosure.

FIG. 7 shows three different cases in which a transmission duration of four symbols comprises an initial transmission and one subsequent transmission, with each transmission having a length of two (2) symbols. For simplicity of explanation, each transmission (e.g., initial or subsequent) can be considered as a repetition, such that the number of repetitions, K, is equal to two (2).

In FIG. 7 case 1, the transmissions are carried out using a fixed layout in the overall frame structure, thereby allowing transmission opportunities for sending K repetitions of any given data packet to begin only at pre-defined or configured starting transmit positions. Moreover, the symbols used for sending all K repetitions of a particular data packet do not overlap with the symbols used for sending any of the K repetitions of any other data packet. In this case, each transmission opportunity has a duration determined by the number of symbols required to send all K repetitions.

In FIG. 7 case 2, the transmission opportunities for sending K repetitions of any particular data packet occur at the start of the set of symbols required for sending any given repetition. In this case, the number of overlapping packets (i.e., sharing symbols) can be up to the transmission duration of a single repetition expressed in symbols, i.e. two data packets can overlap. In FIG. 7 case 3, the transmission opportunities for sending K repetitions of any particular data packet occur on symbol boundaries. In this case, the number of overlapping packets can be up to the transmission duration of all K repetitions used to send a data packet expressed in symbols, i.e. four data packets can overlap.

As can be appreciated from FIG. 7, the higher granularity of starting transmit position (e.g., case 3) can minimize the latency of a data packet as compared to lower granularity (e.g., case 1). However, this improvement in latency can be attained only if the receiver can accurately resolve the starting and/or ending positions for each of the transmitted "overlapping" data packets from different senders or the starting and/or ending position of a specific transmitted data packet from a given sender. Moreover, the receiver also must be capable of identifying control information related to each data packet for which the starting and/or ending position has been resolved, e.g., an HARQ process ID. Both of these requirements can lead to increased signaling overhead, which is very undesirable.

Exemplary embodiments disclosed herein address these problems, issues, and/or drawbacks of existing solutions by providing a flexible but efficient approach for a UE to implicitly signal a starting transmit position of repetitions of a UL data packet, as well as an identifier (e.g., HARQ process ID) associated with the data packet. Exemplary embodiments accomplish this in various particular ways, as explained in more detail below.

As briefly mentioned above, any overlap between transmissions associated with different data packets needs to be resolvable by the receiver. The receiver typically must be able to determine the starting transmit position of the transmission associated with a given data packet, and, optionally, the end position. Typically (but not always), with a configured transmission length, the end position is implicit from the starting transmit position.

The receiver also should be able to determine any "implicitly" transmitted control information. For example, rather than sending control information explicitly (i.e., by dedicated bits that can be decoded similarly to a data portion), control information can also be implied by other characteristics of the transmitted signal and/or its information content that is nominally unrelated to the implicit control information. For example, rather than including a dedicated HARQ process ID field in the transmission associated with a particular data packet, that information can be implicitly derived based on other information, such as when and/or where the transmission occurred.

Related U.S. Pat. Appl. No. 62/544,571 describes how multiple (L) cyclic shifts (CS) of the DMRS can be used to identify the starting transmit position of a K-repetition sequence used for sending a data packet, as well as for resolving certain ambiguities in the rule(s) used to calculate HARQ process ID associated with the data packet. In this approach, the number of CS (L) is strictly equal to the number of repetitions used (K). Since the space of available CS is limited, assigning multiple ones to a single UE for resolution of these parameters is inefficient at best, and when the number of repetitions and/or process ID rule(s) complexity grow beyond the CS space, the solution is no longer feasible.

Accordingly, exemplary embodiments of the present disclosure facilitate configurations where the number of different configured CS values (e.g., available for selection as part of a CS sequence) is less than the number of repetitions used, e.g., L<K. In effect, the L CS values allocated over the K repetitions can facilitate separation and/or differentiation between different starting transmit positions of the K-repetition sequence, and also can facilitate identifying the HARQ process ID associated with data packet being transmitted with the K-repetition sequence.

Figures 8A, 8B:
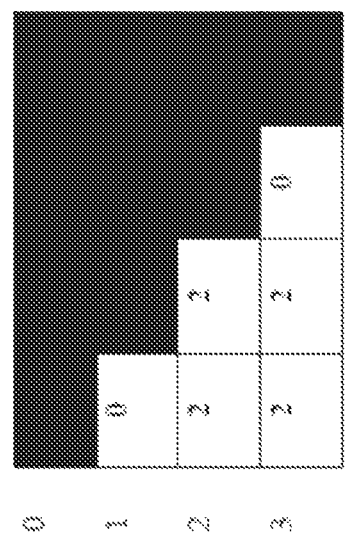
FIGS. 8A and 8B, illustrates some exemplary embodiments of the present disclosure that utilize patterns of L=2 DMRS CS to encode K=4 possible starting transmit positions of repetitions of a particular data packet.

In some exemplary embodiments, the repetition window and the process ID can be identified by using sequences of DMRS symbols in which the selected CS for each sequence minimizes the CS overlap of repetition windows with different starting transmit positions. FIG. 8, which includes FIGS. 8A and 8B, illustrates an example of this embodiment in which K=4 and L=2. In the example shown, a DMRS can have L=2 different configured CS values (e.g., {X, Y}), and the starting granularity is equal to a single transmission duration (e.g., TTI, including short TTI), such that the repetition can have K=4 different configured starting transmit positions (e.g., at the beginning of four different OFDM symbols).

As can be seen in FIG. 8A, the DMRS sequence overlap is determined by selecting a given sequence (e.g., a row of FIG. 8A) and, beginning at the starting transmit position of that sequence, comparing the DMRS CS value used for each symbol in that four-position sequence to the DMRS CS value used for the equivalent symbol in any of the other sequences (e.g., other rows of FIG. 8A). With the exemplary sequences shown in FIG. 8A, a maximum of two symbols will have the same DMRS value as the equivalent symbol in another sequence. FIG. 8B shows an exemplary matrix or table that illustrates the number of symbols overlapping between concurrent DMRS CS sequences in two starting positions, represented by the row and column numbering.

For example, a sequence of four symbols in row 2 of FIG. 8A (which starts with the cell in column 1) all have the same DMRS CS value, Y, and when compared with the equivalent symbols in row 3 of FIG. 8 (e.g., the cells in columns 1, 2, 3 and 4), only two of these four symbols have the same CS value, Y. This is indicated by the entry in row 2, column 1 of the table below. Similarly, the "0" entries in row 1, column 0 and row 3, column 2 of the table below indicate none of the DMRS CS values overlap for these row comparisons according to FIG. 8A.

As can be seen in FIG. 8, the same sequence of DM-RS CS values (i.e., XYXY) is used over the respective repetition windows for both starting transmit positions 2 and 3. However, due to the different starting transmit positions, a single CS value (e.g., X) does not occur in the same transmission opportunity for both starting transmit positions 2 and 3. As such, it is not the sequences itself that should have minimal overlap, but rather the sequences as mapped to the physical resources in the frame structure.

It can be noted that as long as the DMRS detection (e.g., in the eNB receiver) is robust enough compared to the operating SINR of the data transmission, it can be acceptable to only have two DMRS positions differing (i.e., two non-differing) when determining the starting transmit position and/or process ID, even if the repetitions used are four.

Figures 9, 10:
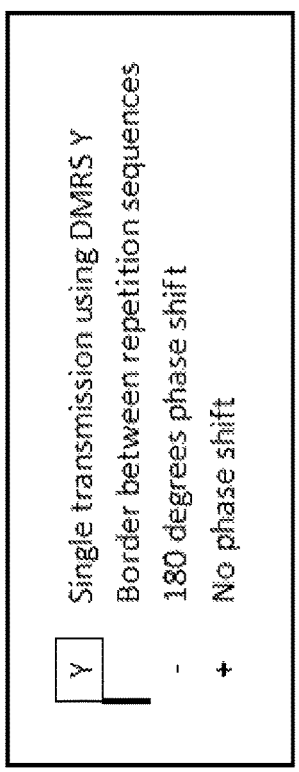
FIG. 9 illustrates some exemplary embodiments of the present disclosure that utilize patterns of L=2 DMRS CS and two CS phase shifts to encode K=4 possible starting transmit positions of repetitions of a particular data packet.
FIG. 10 illustrates some exemplary embodiments of the present disclosure that utilize patterns of L=2 DMRS CS to encode starting transmit positions of K=4 data packet repetitions and a Hybrid ARQ (HARQ) identifier associated with the data packet.

In other exemplary embodiments, a further level of separation can be introduced where, in case of DMRS overlap, the phase of the transmitted DMRS is controlled such that different phases can be used depending on the starting transmit position. FIG. 9 illustrates an example of this embodiment utilizing phase-shift separation in which K=4 configured starting transmit positions and L=2 configured CS values (e.g., {X, Y}). As shown in the figure, the positive sign ("+") indicates that no (i.e., zero-degree) phase shift is applied to the reference phase of the DMRS CS (e.g., "X+"), whereas a negative sign ("−") indicates that a 180-degree phase shift is applied to the reference phase of the DMRS CS (e.g., "Y−"). In this embodiment, the receiver can examine different DMRS hypothesis by applying the same code as the intended starting transmit position at the receiver.

It should be noted that the exemplary approach shown in FIG. 9 is not orthogonal irrespective of starting transmit position of the assumed repetition window by the receiver. For example, when examining a repetition window over transmission opportunities 1-4, the two overlapping "Y+" DMRS in transmission opportunity 3 for starting transmit position 1 and 2 cannot be distinguished by the receiver. As such, starting transmit positions 1 and 2 are only separable based on three of four DMRS within 1-4. Even so, this reduced separation can be sufficient in certain scenarios where signal strength/quality is sufficient. In other scenarios, a different phase-shifting arrangement can be employed to guarantee orthogonality irrespective of assumed starting transmit position of the repetition window.

In other exemplary embodiments, a set of two DMRS CS can be used, wherein a default DMRS CS is used based on a fixed border in the overall frame structure, the border being the same irrespective of the starting transmit position (e.g., TTI) of the K-repetition window used for sending any given data packet. The quantity of TTIs between any two consecutive borders can be determined by the value of K. In other words, the particular DMRS CS used for the first repetition is the same regardless of starting transmit position, and all repetitions that are within the same border as the first repetition used that same particular DMRS CS. But if/when a repetition window crosses a fixed border in the frame structure, the DMRS CS can be switched to the alternative, which can be used for the remainder of the repetition pattern.

FIG. 10 illustrates an example of this embodiment K=4 repetitions, L=2 configured CS values {X, Y}, and eight (8) configured starting transmit positions. Each single transmission is labelled with the DMRS CS value that it employs (e.g., X) and an HARQ process ID (e.g., 0) associated with the data packet currently being transmitted. The process ID can be determined from the particular fixed repetition window in which the first repetition is performed, such as by:

$$HARQ_{ID} = \mod\left(\left\lfloor \frac{Tx_{Init}}{K} \right\rfloor, N_{HARQ}\right),$$

where $Tx_{Init}$ is the index of the first repetition in the overall frame structure and $N_{HARQ}$ is the total number of active HARQ processes. Similarly, the particular DMRS CS ($DMRS_k$) to be used can be determined according to:

$$k = \mathrm{mod}\left(\left\lfloor \frac{Tx}{K} \right\rfloor + HARQ_{ID}, L\right),$$

where Tx is the index of a specific transmission in the overall frame structure. In case of K=4 repetitions as shown in FIG. 10, Tx can be {0 . . . 7}. Note that due to the low number of CSs used, there is an ambiguity on where the repetition starts and stops. As such, this embodiment can be used primarily to determine the HARQ process ID. Nevertheless, this embodiment is advantageous for these purposes since only one DMRS CS needs to be correctly detected (e.g., out of K repetitions) to determine that a certain process ID has been transmitted.

In certain variations of these exemplary embodiments, the default DMRS CS can be incremented modulo the number of available HARQ processes. In other variations of these embodiments, two DMRS CS sets (e.g., of multiple CS) can be used instead a single set of two DMRS CS. In such embodiments, a DMRS pattern can be determined/used independent of the set selected. For example, with four DMRS CS in a set, a pattern of {1,2,4,3} can be used within each set of the number of sets. The transition between sets can occur at a fixed border crossing, as discussed above. For example, the initial transmission and any subsequent repetitions within the same border can use set 1, while after the border crossing, set 2 is used for subsequent repetitions.

The derivation of the process ID can also be used in the previous embodiments after determining $Tx_{Init}$ from the DMRS pattern. The process ID for embodiment 1 and 2 could also be derived assuming for example mod ($Tx_{Init}$, $N_{HARQ}$). In other words, since the transmission starting transmit position varies in the different cases, the process ID can be uniquely identified.

Figure 11:
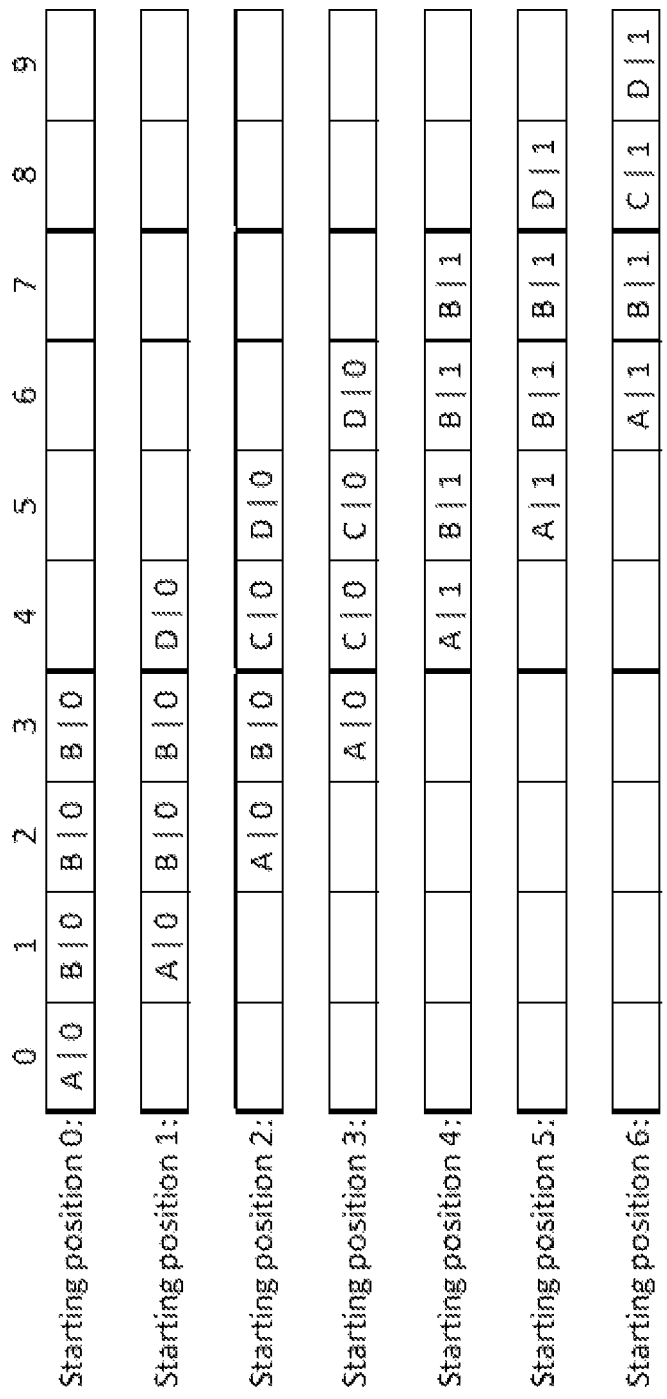
FIG. 11 illustrates some exemplary embodiments of the present disclosure that utilize patterns of L=4 DMRS CS to encode starting transmit positions of K=4 data packet repetitions and a Hybrid ARQ (HARQ) identifier associated with the data packet.

In other exemplary embodiments, a set of four DMRS CS can be used together with fixed borders in the overall frame structure. FIG. 11 illustrates an example of this embodiment in which K=4 configured starting transmit positions for any given data packet (e.g., eight total) and L=4 configured CS values (e.g., {A, B, C, D}). Similar to other exemplary embodiments described above, the starting transmit position (e.g., starting TTI) of a K-repetition window used for sending any given data packet can be any TTI within the set of TTIs between the fixed borders. The quantity of TTIs between any two consecutive borders can be determined based on the value of the repetition factor K. Each of the K TTIs between two consecutive borders can be associated with the same nominal HARQ process ID (nominal PID), with a value determined using the formula below:

nominal PID=(current TTI div K)mod $N_{HARQPID}$, where current TTI is the TTI number corresponding to any specific TTI within any specific SFN (system frame number, modulo 1024) within any specific HFN (hype frame number, modulo 1024) of the LTE air interface. If a TTI does not contain the nominal PID then it necessarily contains nominal PID−1.

The use of L=4 configured CS values enables and/or facilitates the receiver to determine both the PID and the repetition sequence number (i.e., which of K repetitions) of a data packet it receives within a given TTI. The following two examples and/or use cases further illustrates this approach. In exemplary use case 1, the L=configured 4 CS values can represent the following conditions:

DMRS CS1: TTI contains nominal PID, first of K repetitions.
DMRS CS2: TTI contains nominal PID, intermediate repetition (could be last repetition).
DMRS CS3: TTI does not contain nominal PID, intermediate repetition (excludes last).
DMRS CS4: TTI does not contain nominal PID, last repetition.

The above exemplary use case corresponds to FIG. 11, where CS1-CS4 are A-D, respectively, and nominal PID=0 for first four TTIs, nominal PID=1 for second four TTIs, etc. In exemplary use case 2, below, the L=4 configured CS values can represent the following conditions:

DMRS CS1: TTI contains nominal PID, second of K repetitions.
DMRS CS2: TTI contains nominal PID, intermediate repetition (could be first or last repetition).
DMRS CS3: TTI does not contain nominal PID, intermediate repetition (excludes next-to-last repetition).
DMRS CS4: TTI does not contain nominal PID, next-to-last repetition.

In other exemplary embodiments, the DMRS CS can be configured to be shared between TTIs, e.g., between respective short TTIs comprising subslots. In such embodiments, fewer than K DMRS will be transmitted for a K-repetition configuration. As such, the start of the repetition sequence can't be identified in the TTIs that are missing DMRS. Nevertheless, if L DMRS CS are configured, the CS can indicate the start of the repetition sequence in a similar way as described above with respect to other exemplary embodiments.

As an example, consider sharing of DMRS between two TTIs, e.g., TTI 1 comprising data, and TTI 2 comprising DMRS and data. If the repetition sequence starts in TTI 1, the DMRS in TTI 2 is sent with CS 1, but if the repetition sequence starts in TTI 2, the DMRS is sent with CS 2. Similarly, for K=4 repetitions, the DMRS CS can be configured according to start of sequence even if one or more DMRS is not transmitted in the starting TTI. Assuming K=4, CS sequence={a, b, c, d}, and no DMRS in TTI 2, the following table provides exemplary patterns that can be employed according to this embodiment:

| Sequence | TTI 0 | TTI 1 | TTI 2 | TTI 3 | TTI 4 | TTI 5 | TTI 6 |
| --- | --- | --- | --- | --- | --- | --- | --- |
| 0 = {0, 1, 2, 3} | a | b | — | d | | | |
| 1 = {1, 2, 3, 4} | | a | — | c | d | | |
| 2 = {2, 3, 4, 5} | | | — | b | c | d | |
| 3 = {3, 4, 5, 6} | | | | a | b | c | d |

In other words, the table above illustrates that, according to these embodiments, even if DMRS are not transmitted in a particular TTI, that TTI is still considered as part of a DMRS CS sequence for purposes of determining starting transmit position of the initial repetition and/or HARQ process ID. As such, in a following TTI, a subsequent DMRS CS is chosen as if the previous (missing) DMRS CS were actually transmitted. In variations of these embodiments, if a sequence starts in a TTI that would normally not (e.g., be configured not to) contain DMRS, a DMRS can be inserted (e.g., by a UE) in that TTI to facilitate the determination of starting transmit position and/or HARQ process ID.

In all exemplary embodiments discussed above, the actual signaling for the DMRS sequence to be used can be semi-statically configured by RRC, dynamically signaled by the DL control indicator (DCI) sent by the eNB, or pre-defined according to 3GPP specifications. Moreover, any of the above-described exemplary embodiments can also be used in conjunction with conventional approaches to minimize DMRS overlap based on using different time-domain symbols (e.g., within a TTI) for transmitting DMRS corresponding to different data packet repetition starting transmit positions. For example, the above-described embodiments can be used as a secondary measure to distinguish starting transmit positions when it is undesirable, infeasible, and/or impossible to use different time-domain symbols as a primary distinction mechanism.

Figure 12:
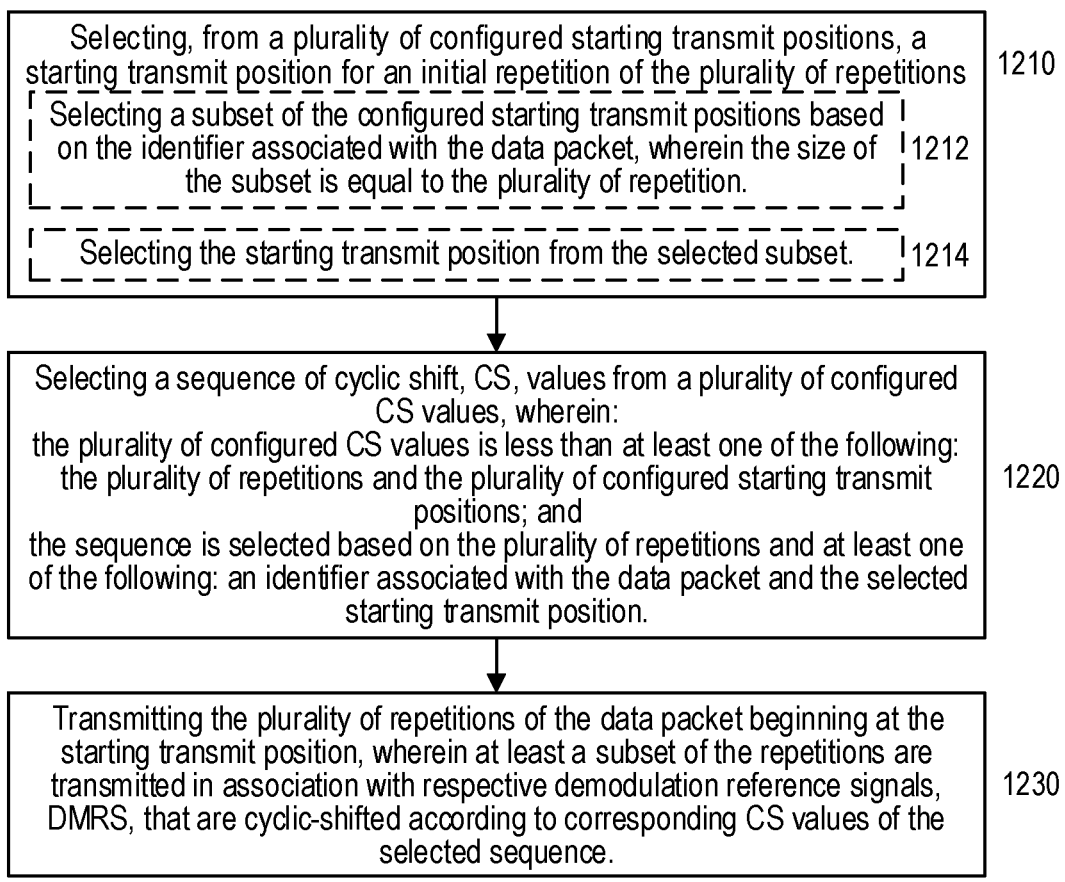
FIG. 12 is a flow diagram of an exemplary method and/or procedure performed by a UE in communication with a network node in a wireless communication network, according to one or more exemplary embodiments of the present disclosure.

FIG. 12 shows a flow diagram of an exemplary method and/or procedure for transmitting control information, to a network node in a wireless communication network, in association with a plurality of repetitions of a data packet, according to one or more exemplary embodiments of the present disclosure. The exemplary method and/or procedure can be performed by a user equipment (UE, or component of a UE, such as a modem) in communication with the network node (e.g., base station, eNB, gNB, ng-eNB, en-gNB, etc., or components thereof), such as shown in or described with reference to other figures herein. Additionally, the exemplary method and/or procedure shown in FIG. 12 can be utilized cooperatively with exemplary methods and/or procedures shown in or described with reference to other figures herein, to provide various exemplary benefits described herein. In addition, although FIG. 12 shows blocks in a particular order, this order is merely exemplary, and the operations of the exemplary method and/or procedure can be performed in a different order than shown in FIG. 12 and can be combined and/or divided into blocks having different functionality. Optional operations are indicated by dashed lines.

The exemplary method and/or procedure illustrated in FIG. 12 can include the operations of block 1210, where the UE can select a starting transmit position for an initial repetition of the plurality of repetitions of the data packet. The plurality of repetitions can include an initial repetition and one or more further repetitions including, e.g., a final repetition. The starting transmit position can be selected from a plurality of configured starting transmit positions. In some exemplary embodiments, the starting transmit position can be selected to minimize latency of the data packet.

In some embodiments, the operations of block 1210 can include the operations of sub-block 1212, where the UE can select a subset of the configured starting transmit positions based on the identifier associated with the data packet, wherein the size of the subset is equal to the plurality of repetitions. In some embodiments, the subset can be selected from a plurality of subsets, each subset comprising a plurality of consecutive starting transmit positions associated with a particular value of the identifier. Furthermore, in such embodiments, at least two of the subsets can be consecutive and separated by a fixed timing border in a transmission frame. In addition, the subsets separated by the fixed timing border can be associated with different values of the identifier. In some embodiments, the operations of block 1210 can also include the operations of sub-block 1214, where the UE can select the starting transmit position from among the selected subset.

The exemplary method and/or procedure can also include operations of block 1220, where the UE can select a sequence of cyclic shift (CS) values from a plurality of configured CS values. The plurality of configured CS values can be less than at least one of the following: the plurality of repetitions, and the plurality of configured starting transmit positions. For example, there can be L=2 configured CS values and four (4) configured starting transmit positions, with one starting position selected for transmitting the K=4 repetitions of the data packet. In addition, the sequence can be selected based on the plurality of repetitions and at least one of the following: an identifier associated with the data packet, and the selected starting transmit position. In some embodiments, the identifier associated with the data packet comprises a hybrid ARQ process identifier (HARQ ID). In some embodiments, the number of different CS values used in the sequence can be less than the plurality of configured starting transmit positions.

In some embodiments, the sequence of CS values does not overlap with at least one first sequence of CS values, and each first sequence corresponds to repetitions of a further data packet that can be transmitted during the consecutive intervals. In some embodiments, the sequence of CS values partially overlaps with at least one second sequence of CS values, and each second sequence corresponds to repetitions of a further data packet that can be transmitted during the consecutive intervals. In some embodiments, the sequence of CS values can be orthogonal to further sequences of CS used to represent further ones of the configured starting transmit positions.

In some embodiments, the selected sequence can comprise a first plurality of first CS values followed by a second plurality of second CS values, with the first plurality and the second plurality being selected based on the starting transmit position. For example, the first CS values can be part of a first default sequence, and the second CS values can be part of a second default sequence.

In some embodiments, the plurality of configured CS values is less than the plurality of configured starting transmit positions for initial repetitions of data packets. In such embodiments, each CS value of the selected sequence indicates: a value of the identifier; and whether the repetition associated with the CS value is the initial repetition, an intermediate repetition, or a final repetition.

The exemplary method and/or procedure can also include operations of block 1230, where the UE transmit the plurality of repetitions of the data packet beginning at the starting transmit position. In addition, at least a subset of the repetitions can be transmitted in association with respective DMRS that are cyclic-shifted according to corresponding CS values of the selected sequence. In some embodiments, at least one of the repetitions is transmitted without an associated DMRS, e.g., in a data-only subslot. In some embodiments, the plurality of repetitions can be transmitted in a corresponding plurality of consecutive intervals, where each configured starting transmit position is during one of the consecutive intervals. In some embodiments, the DMRS that is transmitted in association with each repetition is also phase-shifted by one of two phase-shift (PS) values.

Figure 13:
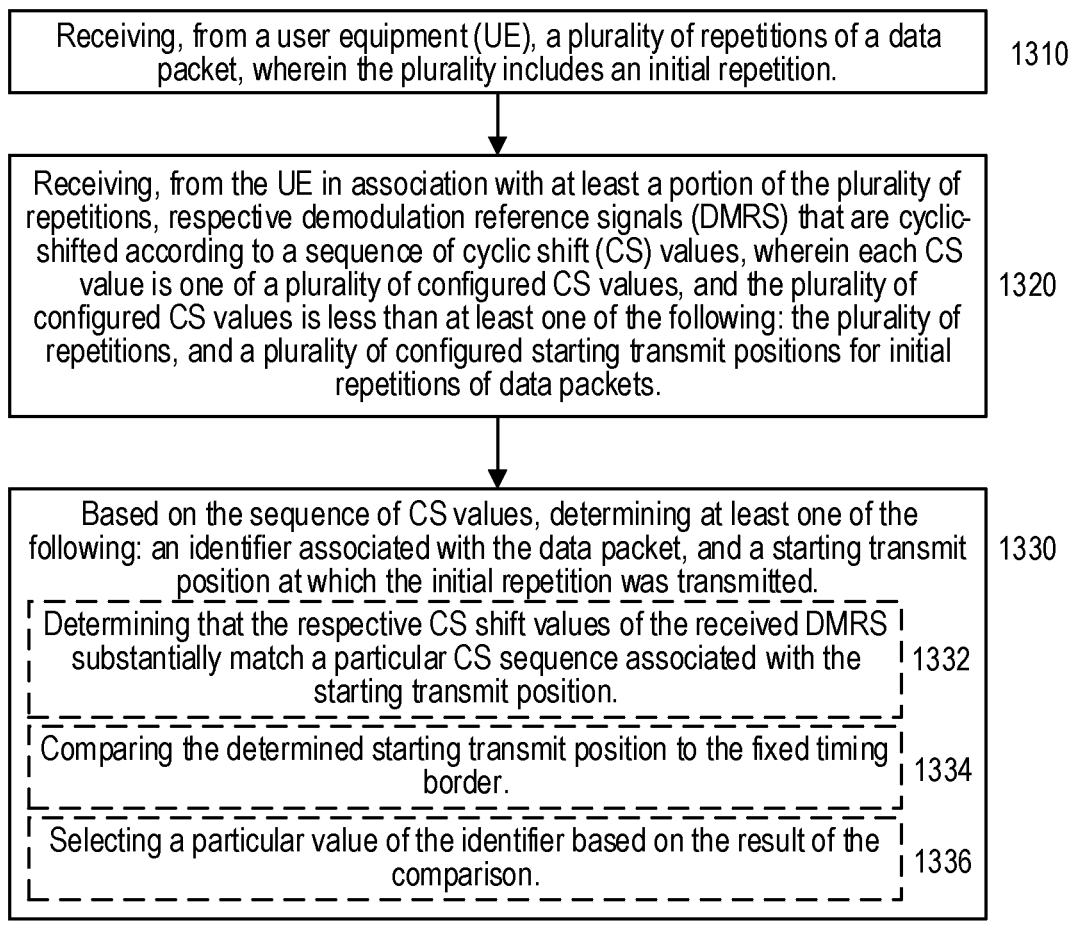
FIG. 13 is a flow diagram of an exemplary method and/or procedure performed by a network node in communication with a UE in a wireless communication network, according to one or more exemplary embodiments of the present disclosure.

FIG. 13 shows a flow diagram of an exemplary method and/or procedure for receiving control information from a user equipment (UE) in association with a plurality of repetitions of a data packet, according to one or more exemplary embodiments of the present disclosure. The exemplary method and/or procedure can be performed by a network node (e.g., base station, eNB, gNB, ng-eNB, en-gNB, etc., or component(s) thereof) in a wireless communication network, such as shown in or described with reference to other figures herein. Additionally, the exemplary method and/or procedure shown in FIG. 13 can be utilized cooperatively with exemplary methods and/or procedures shown in or described with reference to other figures herein, to provide various exemplary benefits described herein. In addition, although FIG. 13 shows blocks in a particular order, this order is merely exemplary, and the operations of the exemplary method and/or procedure can be performed in a different order than shown in FIG. 13 and can be combined and/or divided into blocks having different functionality. Optional operations are indicated by dashed lines.

The exemplary method and/or procedure illustrated in FIG. 13 can include the operations of block 1310, where the network node can receive, from the UE a plurality of repetitions of a data packet, the plurality including an initial repetition. In some embodiments, the plurality of repetitions can be received in a corresponding plurality of consecutive intervals, and each configured starting transmit position is during one of the consecutive intervals.

The exemplary method and/or procedure can also include operations of block 1320, where the network node can receive, from the UE in association with of at least a portion of the plurality of repetitions, respective demodulation reference signals (DMRS) that are cyclic-shifted according to a sequence of cyclic shift (CS) values. Furthermore, each CS value can be one of a plurality of configured CS values, and the plurality of configured CS values can be less than at least one of the following: the plurality of repetitions, and a plurality of configured starting transmit positions for initial repetitions of data packets. For example, there can be L=2 configured CS values and four (4) configured starting transmit positions, with one starting position selected for transmitting the K=4 repetitions of the data packet. In some embodiments, the number of different CS values used in the sequence can be less than the plurality of configured starting transmit positions.

In some embodiments, the received DMRS are also phase-shifted by one of two phase-shift (PS) values. In some embodiments, at least one of the repetitions is received without an associated DMRS, e.g., during a data-only sub-slot.

In some embodiments, the sequence of CS values does not overlap with at least one first sequence of CS values, and each first sequence corresponds to repetitions of a further data packet that can be transmitted during the consecutive intervals. In some embodiments, the sequence of CS values partially overlaps with at least one second sequence of CS values, and each second sequence corresponds to repetitions of a further data packet that can be transmitted during the consecutive intervals. In some embodiments, the sequence of CS values can be orthogonal to further sequences of CS used to represent further ones of the configured starting transmit positions.

In some embodiments, the sequence of CS values can comprise a first plurality of first CS values followed by a second plurality of second CS values, with the first plurality and the second plurality being selected based on the starting transmit position. For example, the first CS values can be part of a first default sequence, and the second CS values can be part of a second default sequence.

In some embodiments, the number of CS values available for selection is less than the plurality of configured starting transmit positions for initial repetitions of data packets. In such embodiments, each CS value of the selected sequence indicates: a value of the identifier; and whether the repetition associated with the CS value is the initial repetition, an intermediate repetition, or a final repetition.

The exemplary method and/or procedure also includes operations of block 1330, where the network node can determine, based on the sequence of CS values, at least one of the following: an identifier associated with the data packet; and a starting transmit position at which the initial repetition was transmitted. In some exemplary embodiments, the identifier associated with the data packet comprises a hybrid ARQ process identifier (HARQ ID).

In some embodiments, the operations of block 1330 can include the operations of sub-block 1332, where the network node can determine that the respective CS shift values of the received DMRS substantially match a particular CS sequence associated with the starting transmit position.

In other embodiments, the configured starting transmit positions can include a plurality of subsets, each subset comprising a plurality of consecutive starting transmit positions associated with a particular value of the identifier. Furthermore, first and second ones of the subsets can be consecutive and are separated by a fixed timing border in a transmission frame structure. In addition, the subsets separated by the fixed timing border can be associated with different values of the identifier. In such embodiments, the operations of block 1330 can include the operations of sub-blocks 1334 and 1336, respectively, where the network node can compare the determined starting transmit position to the fixed timing border, and select a particular value of the identifier based on the result of the comparison.

Figure 14:
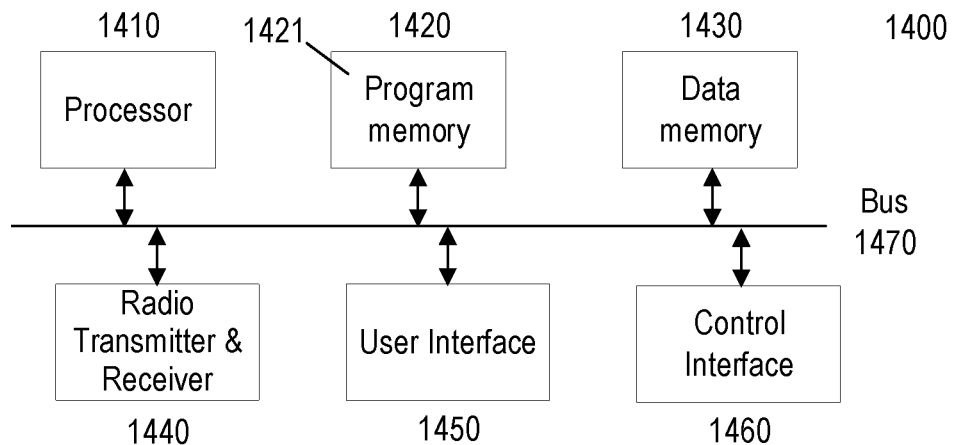
FIG. 14 is a block diagram of an exemplary wireless device or UE configurable according to various exemplary embodiments.

Although various embodiments are described herein above in terms of methods, apparatus, devices, computer-readable medium and receivers, the person of ordinary skill will readily comprehend that such methods can be embodied by various combinations of hardware and software in various systems, communication devices, computing devices, control devices, apparatuses, non-transitory computer-readable media, etc. FIG. 14 shows a block diagram of an exemplary wireless device or user equipment (UE) configurable according to various exemplary embodiments of the present disclosure, including execution of instructions on a computer-readable medium comprising one or more exemplary methods for configuring and/or utilizing a plurality of transmit and/or receive conversion systems according to one or more of the embodiments described herein above.

Exemplary device 1400 can comprise a processor 1410 that can be operably connected to a program memory 1420 and/or a data memory 1430 via a bus 1470 that can comprise parallel address and data buses, serial ports, or other methods and/or structures known to those of ordinary skill in the art. Program memory 1420 can store software code, programs, and/or instructions (collectively shown as computer program product 1421 in FIG. 14) executed by processor 1410 that can configure and/or facilitate device 1400 to perform various operations, including operations described below. For example, program memory 1420 can include software code or program executed by processor 1410 that facilitates, causes and/or programs exemplary device 1400 to communicate using one or more wired or wireless communication protocols, including one or more wireless communication protocols standardized by 3GPP, 3GPP2, or IEEE, such as those commonly known as 5G/NR, LTE, LTE-A, UMTS, HSPA, GSM, GPRS, EDGE, 1×RTT, CDMA2000, 802.11 WiFi, HDMI, USB, Firewire, etc., or any other current or future protocols that can be utilized in conjunction with radio transceiver 1440, user interface 1450, and/or host interface 1460.

For example, processor 1410 can execute program code stored in program memory 1420 that corresponds to MAC, RLC, PDCP, and RRC layer protocols standardized by 3GPP (e.g., for NR and/or LTE). As a further example, processor 1410 can execute program code stored in program memory 1420 that, together with radio transceiver 1440, implements corresponding PHY layer protocols, such as Orthogonal Frequency Division Multiplexing (OFDM), Orthogonal Frequency Division Multiple Access (OFDMA), and Single-Carrier Frequency Division Multiple Access (SC-FDMA).

Program memory 1420 can also comprise software code executed by processor 1410 to control the functions of device 1400, including configuring and controlling various components such as radio transceiver 1440, user interface 1450, and/or host interface 1460. Program memory 1420 can also comprise one or more application programs and/or modules comprising computer-executable instructions embodying any of the exemplary methods and/or procedures described herein. Such software code can be specified or written using any known or future developed programming language, such as e.g., Java, C++, C, Objective C, HTML, XHTML, machine code, and Assembler, as long as the desired functionality, e.g., as defined by the implemented method steps, is preserved. In addition, or as an alternative, program memory 1420 can comprise an external storage arrangement (not shown) remote from device 1400, from which the instructions can be downloaded into program memory 1420 located within or removably coupled to device 1400, so as to enable execution of such instructions.

Data memory 1430 can comprise memory area for processor 1410 to store variables used in protocols, configuration, control, and other functions of device 1400, including operations corresponding to, or comprising, any of the exemplary methods and/or procedures described herein. Moreover, program memory 1420 and/or data memory 1430 can comprise non-volatile memory (e.g., flash memory), volatile memory (e.g., static or dynamic RAM), or a combination thereof. Furthermore, data memory 1430 can comprise a memory slot by which removable memory cards in one or more formats (e.g., SD Card, Memory Stick, Compact Flash, etc.) can be inserted and removed. Persons of ordinary skill in the art will recognize that processor 1410 can comprise multiple individual processors (including, e.g., multi-core processors), each of which implements a portion of the functionality described above. In such cases, multiple individual processors can be commonly connected to program memory 1420 and data memory 1430 or individually connected to multiple individual program memories and or data memories. More generally, persons of ordinary skill in the art will recognize that various protocols and other functions of device 1400 can be implemented in many different computer arrangements comprising different combinations of hardware and software including, but not limited to, application processors, signal processors, general-purpose processors, multi-core processors, ASICs, fixed and/or programmable digital circuitry, analog baseband circuitry, radio-frequency circuitry, software, firmware, and middleware.

A radio transceiver 1440 can comprise radio-frequency transmitter and/or receiver functionality that facilitates the device 1400 to communicate with other equipment supporting like wireless communication standards and/or protocols. In some exemplary embodiments, the radio transceiver 1440 includes a transmitter and a receiver that enable device 1400 to communicate with various 5G/NR networks according to various protocols and/or methods proposed for standardization by 3GPP and/or other standards bodies. For example, such functionality can operate cooperatively with processor 1410 to implement a PHY layer based on OFDM, OFDMA, and/or SC-FDMA technologies, such as described herein with respect to other figures.

In some exemplary embodiments, the radio transceiver 1440 includes an LTE transmitter and receiver that can facilitate the device 1400 to communicate with various LTE LTE-Advanced (LTE-A), and/or NR networks according to standards promulgated by 3GPP. In some exemplary embodiments of the present disclosure, the radio transceiver 1440 includes circuitry, firmware, etc. necessary for the device 1400 to communicate with various 5G/NR, LTE, LTE-A, UMTS, and/or GSM/EDGE networks, also according to 3GPP standards. In some exemplary embodiments of the present disclosure, radio transceiver 1440 includes circuitry, firmware, etc. necessary for the device 1400 to communicate with various CDMA2000 networks, according to 3GPP2 standards.

In some exemplary embodiments of the present disclosure, the radio transceiver 1440 is capable of communicating using radio technologies that operate in unlicensed frequency bands, such as IEEE 802.11 WiFi that operates using frequencies in the regions of 2.4, 5.6, and/or 60 GHz. In some exemplary embodiments of the present disclosure, radio transceiver 1440 can comprise a transceiver that is capable of wired communication, such as by using IEEE 802.3 Ethernet technology. The functionality particular to each of these embodiments can be coupled with or controlled by other circuitry in the device 1400, such as the processor 1410 executing program code stored in program memory 1420 in conjunction with, or supported by, data memory 1430.

User interface 1450 can take various forms depending on the particular embodiment of device 1400, or can be absent from device 1400 entirely. In some exemplary embodiments, user interface 1450 can comprise a microphone, a loudspeaker, slidable buttons, depressible buttons, a display, a touchscreen display, a mechanical or virtual keypad, a mechanical or virtual keyboard, and/or any other user-interface features commonly found on mobile phones. In other embodiments, the device 1400 can comprise a tablet computing device including a larger touchscreen display. In such embodiments, one or more of the mechanical features of the user interface 1450 can be replaced by comparable or functionally equivalent virtual user interface features (e.g., virtual keypad, virtual buttons, etc.) implemented using the touchscreen display, as familiar to persons of ordinary skill in the art. In other embodiments, the device 1400 can be a digital computing device, such as a laptop computer, desktop computer, workstation, etc. that comprises a mechanical keyboard that can be integrated, detached, or detachable depending on the particular exemplary embodiment. Such a digital computing device can also comprise a touch screen display. Many exemplary embodiments of the device 1400 having a touch screen display are capable of receiving user inputs, such as inputs related to exemplary methods and/or procedures described herein or otherwise known to persons of ordinary skill in the art.

In some exemplary embodiments of the present disclosure, device 1400 can comprise an orientation sensor, which can be used in various ways by features and functions of device 1400. For example, the device 1400 can use outputs of the orientation sensor to determine when a user has changed the physical orientation of the device 1400's touch screen display. An indication signal from the orientation sensor can be available to any application program executing on the device 1400, such that an application program can change the orientation of a screen display (e.g., from portrait to landscape) automatically when the indication signal indicates an approximate 90-degree change in physical orientation of the device. In this exemplary manner, the application program can maintain the screen display in a manner that is readable by the user, regardless of the physical orientation of the device. In addition, the output of the orientation sensor can be used in conjunction with various exemplary embodiments of the present disclosure.

A control interface 1460 of the device 1400 can take various forms depending on the particular exemplary embodiment of device 1400 and of the particular interface requirements of other devices that the device 1400 is intended to communicate with and/or control. For example, the control interface 1460 can comprise an RS-232 interface, an RS-485 interface, a USB interface, an HDMI interface, a Bluetooth interface, an IEEE ("Firewire") interface, an I$^2$C interface, a PCMCIA interface, or the like. In some exemplary embodiments of the present disclosure, control interface 1460 can comprise an IEEE 802.3 Ethernet interface such as described above. In some exemplary embodiments of the present disclosure, the control interface 1460 can comprise analog interface circuitry including, for example, one or more digital-to-analog (D/A) and/or analog-to-digital (A/D) converters.

Persons of ordinary skill in the art can recognize the above list of features, interfaces, and radio-frequency communication standards is merely exemplary, and not limiting to the scope of the present disclosure. In other words, the device 1400 can comprise more functionality than is shown in FIG. 14 including, for example, a video and/or still-image camera, microphone, media player and/or recorder, etc. Moreover, radio transceiver 1440 can include circuitry necessary to communicate using additional radio-frequency communication standards including Bluetooth, GPS, and/or others. Moreover, the processor 1410 can execute software code stored in the program memory 1420 to control such additional functionality. For example, directional velocity and/or position estimates output from a GPS receiver can be available to any application program executing on the device 1400, including various exemplary methods and/or computer-readable media according to various exemplary embodiments of the present disclosure.

Figure 15:
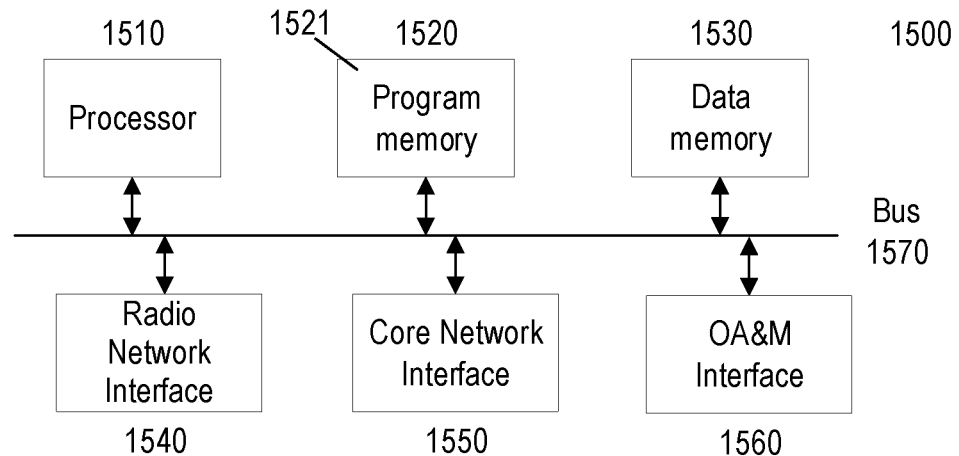
FIG. 15 is a block diagram of an exemplary network node configurable according to various exemplary embodiments.

FIG. 15 shows a block diagram of an exemplary network node 1500 configurable according to various embodiments of the present disclosure, including those described above with reference to other figures. In some exemplary embodiments, network node 1500 can comprise a base station, eNB, gNB, or component thereof. Network node 1500 comprises processor 1510 which is operably connected to program memory 1520 and data memory 1530 via bus 1570, which can comprise parallel address and data buses, serial ports, or other methods and/or structures known to those of ordinary skill in the art.

Program memory 1520 comprises software code, programs, and/or instructions (collectively shown as computer program product 1521 in FIG. 15) executed by processor 1510 that can configure and/or facilitate network node 1500 to communicate with one or more other devices using protocols according to various embodiments of the present disclosure, including one or more exemplary methods and/or procedures discussed above. Program memory 1520 can also comprise software code executed by processor 1510 that can facilitate and specifically configure network node 1500 to communicate with one or more other devices using other protocols or protocol layers, such as one or more of the PHY, MAC, RLC, PDCP, and RRC layer protocols standardized by 3GPP for LTE, LTE-A, and/or NR, or any other higher-layer protocols utilized in conjunction with radio network interface 1540 and core network interface 1550. By way of example and without limitation, core network interface 1550 can comprise the S1 interface and radio network interface 1540 can comprise the Uu interface, as standardized by 3GPP. Program memory 1520 can further comprise software code executed by processor 1510 to control the functions of network node 1500, including configuring and controlling various components such as radio network interface 1540 and core network interface 1550.

Data memory 1530 can comprise memory area for processor 1510 to store variables used in protocols, configuration, control, and other functions of network node 1500. As such, program memory 1520 and data memory 1530 can comprise non-volatile memory (e.g., flash memory, hard disk, etc.), volatile memory (e.g., static or dynamic RAM), network-based (e.g., "cloud") storage, or a combination thereof. Persons of ordinary skill in the art will recognize that processor 1510 can comprise multiple individual processors (not shown), each of which implements a portion of the functionality described above. In such case, multiple individual processors may be commonly connected to program memory 1520 and data memory 1530 or individually connected to multiple individual program memories and/or data memories. More generally, persons of ordinary skill in the art will recognize that various protocols and other functions of network node 1500 may be implemented in many different combinations of hardware and software including, but not limited to, application processors, signal processors, general-purpose processors, multi-core processors, ASICs, fixed digital circuitry, programmable digital circuitry, analog baseband circuitry, radio-frequency circuitry, software, firmware, and middleware.

Radio network interface 1540 can comprise transmitters, receivers, signal processors, ASICs, antennas, beamforming units, and other circuitry that enables network node 1500 to communicate with other equipment such as, in some embodiments, a plurality of compatible user equipment (UE). In some exemplary embodiments, radio network interface can comprise various protocols or protocol layers, such as the PHY, MAC, RLC, PDCP, and RRC layer protocols standardized by 3GPP for LTE, LTE-A, and/or 5G/NR; improvements thereto such as described herein above; or any other higher-layer protocols utilized in conjunction with radio network interface 1540. According to further exemplary embodiments of the present disclosure, the radio network interface 1540 can comprise a PHY layer based on OFDM, OFDMA, and/or SC-FDMA technologies. In some embodiments, the functionality of such a PHY layer can be provided cooperatively by radio network interface 1540 and processor 1510 (including program code in memory 1520).

Core network interface 1550 can comprise transmitters, receivers, and other circuitry that enables network node 1500 to communicate with other equipment in a core network such as, in some embodiments, circuit-switched (CS) and/or packet-switched Core (PS) networks. In some embodiments, core network interface 1550 can comprise the S1 interface standardized by 3GPP. In some exemplary embodiments, core network interface 1550 can comprise one or more interfaces to one or more SGWs, MMEs, SGSNs, GGSNs, and other physical devices that comprise functionality found in GERAN, UTRAN, E-UTRAN, and CDMA2000 core networks that are known to persons of ordinary skill in the art. In some embodiments, these one or more interfaces may be multiplexed together on a single physical interface. In some embodiments, lower layers of core network interface 1550 can comprise one or more of asynchronous transfer mode (ATM), Internet Protocol (IP)-over-Ethernet, SDH over optical fiber, T1/E1/PDH over a copper wire, microwave radio, or other wired or wireless transmission technologies known to those of ordinary skill in the art.

OA&M interface 1560 can comprise transmitters, receivers, and other circuitry that enables network node 1500 to communicate with external networks, computers, databases, and the like for purposes of operations, administration, and maintenance of network node 1500 or other network equipment operably connected thereto. Lower layers of OA&M interface 1560 can comprise one or more of asynchronous transfer mode (ATM), Internet Protocol (IP)-over-Ethernet, SDH over optical fiber, T1/E1/PDH over a copper wire, microwave radio, or other wired or wireless transmission technologies known to those of ordinary skill in the art. Moreover, in some embodiments, one or more of radio network interface 1540, core network interface 1550, and OA&M interface 1560 may be multiplexed together on a single physical interface, such as the examples listed above.

Figure 16:
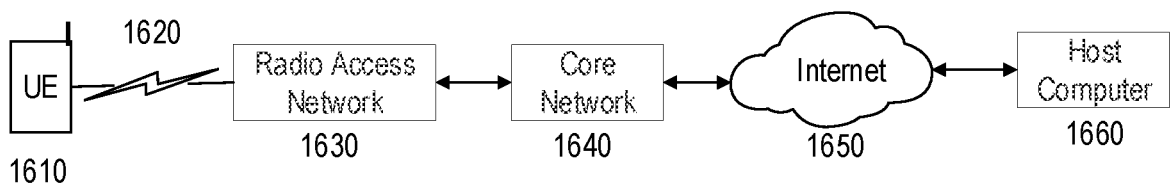
FIG. 16 is a block diagram of an exemplary network configuration usable to provide over-the-top (OTT) data services between a host computer and a UE, according to one or more exemplary embodiments.

FIG. 16 is a block diagram of an exemplary network configuration usable to provide over-the-top (OTT) data services between a host computer and a user equipment (UE), according to one or more exemplary embodiments of the present disclosure. UE 1610 can communicate with radio access network (RAN) 1630 over radio interface 1620, which can be based on protocols described above including, e.g., LTE, LTE-A, and 5G/NR. RAN 1630 can include one or more network nodes (e.g., base stations, eNBs, gNBs, controllers, etc.). RAN 1630 can further communicate with core network 1640 according to various protocols and interfaces described above. For example, one or more apparatus (e.g., base stations, eNBs, gNBs, etc.) comprising RAN 1630 can communicate to core network 1640 via core network interface 1650 described above. In some exemplary embodiments, RAN 1630 and core network 1640 can be configured and/or arranged as shown in other figures discussed above. Similarly, UE 1610 can also be configured and/or arranged as shown in other figures discussed above.

Core network 1640 can further communicate with an external packet data network, illustrated in FIG. 16 as Internet 1650, according to various protocols and interfaces known to persons of ordinary skill in the art. Many other devices and/or networks can also connect to and communicate via Internet 1650, such as exemplary host computer 1660. In some exemplary embodiments, host computer 1660 can communicate with UE 1610 using Internet 1650, core network 1640, and RAN 1630 as intermediaries. Host computer 1660 can be a server (e.g., an application server) under ownership and/or control of a service provider. Host computer 1660 can be operated by the OTT service provider or by another entity on the service provider's behalf.

For example, host computer 1660 can provide an over-the-top (OTT) packet data service to UE 1610 using facilities of core network 1640 and RAN 1630, which can be unaware of the routing of an outgoing/incoming communication to/from host computer 1660. Similarly, host computer 1660 can be unaware of routing of a transmission from the host computer to the UE, e.g., the routing of the transmission through RAN 1630. Various OTT services can be provided using the exemplary configuration shown in FIG. 16 including, e.g., streaming (unidirectional) audio and/or video from host computer to UE, interactive (bidirectional) audio and/or video between host computer and UE, interactive messaging or social communication, interactive virtual or augmented reality, etc.

The exemplary network shown in FIG. 16 can also include measurement procedures and/or sensors that monitor network performance metrics including data rate, latency and other factors that are improved by exemplary embodiments disclosed herein. The exemplary network can also include functionality for reconfiguring the link between the endpoints (e.g., host computer and UE) in response to variations in the measurement results. Such procedures and functionalities are known and practiced; if the network hides or abstracts the radio interface from the OTT service provider, measurements can be facilitated by proprietary signaling between the UE and the host computer.

The exemplary embodiments described herein provide efficient techniques for a UE to implicitly signal a starting transmit position of repetitions of a UL data packet, as well as an identifier (e.g., HARQ process ID) associated with the data packet. For example, such techniques can involve encoding such information in a sequence of cyclic shifts (CS) associated with demodulation reference signals (DMRS), and transmitting DMRS comprising the encoded CS in association with at least a portion of the data packet repetitions. When used in LTE UEs (e.g., UE 1610) and eNBs (e.g., eNBs comprising RAN 1630) supporting configured grant UL transmissions, such exemplary embodiments can provide various improvements, benefits, and/or advantages including reduced transmission latency of UL data packet repetitions; reduced overhead of UL signaling associated with UL data packets repetitions; and reduced energy consumption for transmission and/or reception of such UL signaling information. As such, the improvements, as described herein, can play a critical role by enabling UE 1610 and RAN 1630 to meet the requirements of the particular OTT service between host computer 1660 and UE 1610. These techniques improve data throughput in a coverage area and enable a greater number of users to utilize data-intensive services such as streaming video in various coverage conditions without excessive power consumption or other degradations to user experience.

As described herein, device and/or apparatus can be represented by a semiconductor chip, a chipset, or a (hardware) module comprising such chip or chipset; this, however, does not exclude the possibility that a functionality of a device or apparatus, instead of being hardware implemented, be implemented as a software module such as a computer program or a computer program product comprising executable software code portions for execution or being run on a processor. Furthermore, functionality of a device or apparatus can be implemented by any combination of hardware and software. A device or apparatus can also be regarded as an assembly of multiple devices and/or apparatuses, whether functionally in cooperation with or independently of each other. Moreover, devices and apparatuses can be implemented in a distributed fashion throughout a system, so long as the functionality of the device or apparatus is preserved. Such and similar principles are considered as known to a skilled person.

The term "network node" used herein can be any kind of network node in a radio network which may further comprise any of base station (BS), radio base station, base transceiver station (BTS), base station controller (BSC), radio network controller (RNC), g Node B (gNB), evolved Node B (eNB or eNodeB), Node B, multi-standard radio (MSR) radio node such as MSR BS, multi-cell/multicast coordination entity (MCE), relay node, donor node controlling relay, radio access point (AP), transmission points, transmission nodes, Remote Radio Unit (RRU) Remote Radio Head (RRH), a core network node (e.g., mobile management entity (MME), self-organizing network (SON) node, a coordinating node, positioning node, MDT node, etc.), an external node (e.g., 3rd party node, a node external to the current network), nodes in distributed antenna system (DAS), a spectrum access system (SAS) node, an element management system (EMS), etc. The network node may also comprise test equipment.

As used herein, a "radio access node" (or "radio network node") can be any node in a radio access network (RAN) that operates to wirelessly transmit and/or receive signals. Some examples of radio access nodes include, but are not limited to, a base station (e.g., a New Radio (NR) base station (gNB) in a 3GPP Fifth Generation (5G) NR network or an eNB in a 3GPP LTE network), a high-power or macro base station, a low-power base station (e.g., a micro base station, a pico base station, a home eNB, or the like), a relay node, access point (AP), radio AP, remote radio unit (RRU), remote radio head (RRH), a multi-standard BS (e.g., MSR BS), multi-cell/multicast coordination entity (MCE), base transceiver station (BTS), base station controller (BSC), network controller, NodeB (NB), etc. Such terms can also be used to reference to components of a node, such as a gNB-CU and/or a gNB-DU.

As used herein, the term "radio node" can refer to a wireless device (WD) or a radio network node.

As used herein, a "core network node" can be any type of node in a core network. Some examples of a core network node include, e.g., a Mobility Management Entity (MME), a Packet Data Network Gateway (P-GW), a Service Capability Exposure Function (SCEF), Access and Mobility Management Function (AMF), User Plane Function (UPF), Home Subscriber Server (HSS), etc.

As used herein, a "network node" is any node that is part of a radio access network (e.g., a "radio network node" or "radio access node") or a core network (e.g., a "core network node") of a wireless communication system, such as a cellular communications network/system.

In some embodiments, the non-limiting terms "wireless device" (WD) or "user equipment" (UE) are used interchangeably. The WD herein can be any type of wireless device capable of communicating with a network node or another WD over radio signals, such as wireless device (WD). The WD may also be a radio communication device, target device, device to device (D2D) WD, machine type WD or WD capable of machine-to-machine communication (M2M), low-cost and/or low-complexity WD, a sensor equipped with WD, Tablet, mobile terminals, smart phone, laptop embedded equipped (LEE), laptop mounted equipment (LME), USB dongles, Customer Premises Equipment (CPE), an Internet of Things (IoT) device, or a Narrowband IoT (NB-IOT) device etc.

In some embodiments, the term "slot" is used to indicate a radio resource; however, it should be understood that the techniques described herein may advantageously be used with other types of radio resources, such as any type of physical resource or radio resource expressed in terms of length of time. Examples of time resources include symbols, time slots, mini-slots, subframes, radio frames, transmission time intervals (TTIs), interleaving times, time resource numbers, etc.

In some embodiments, a transmitter (e.g., network node) and a receiver (e.g., WD) previously agrees on rule(s) for determining for which resources the transmitter and receiver will arrange one or more physical channels during transmission of the resources, and this rule may, in some embodiments, be referred to as "mapping." In other embodiments, the term "mapping" may have other meanings.

As used herein, a "channel" can be a logical, transport or physical channel. A channel may comprise and/or be arranged on one or more carriers, in particular a plurality of subcarriers. A channel carrying and/or for carrying control signaling/control information may be considered a control channel, in particular if it is a physical layer channel and/or if it carries control plane information. Analogously, a channel carrying and/or for carrying data signaling/user information may be considered a data channel (e.g., PDSCH), in particular if it is a physical layer channel and/or if it carries user plane information. A channel may be defined for a specific communication direction, or for two complementary communication directions (e.g., UL and DL, or sidelink in two directions), in which case it may be considered to have two component channels, one for each direction.

Furthermore, although the term "cell" is used herein, it should be understood that (particularly with respect to 5G NR) beams may be used instead of cells and, as such, concepts described herein apply equally to both cells and beams.

Note that although terminology from one particular wireless system, such as, for example, 3GPP LTE and/or New Radio (NR), may be used in this disclosure, this should not be seen as limiting the scope of the disclosure to only the aforementioned system. Other wireless systems, including without limitation Wide Band Code Division Multiple Access (WCDMA), Worldwide Interoperability for Microwave Access (WiMax), Ultra Mobile Broadband (UMB) and Global System for Mobile Communications (GSM), may also benefit from exploiting the concepts, principles, and/or embodiments described herein.

Note further, that functions described herein as being performed by a wireless device or a network node may be distributed over a plurality of wireless devices and/or network nodes. In other words, it is contemplated that the functions of the network node and wireless device described herein are not limited to performance by a single physical device and, in fact, can be distributed among several physical devices.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

In addition, certain terms used in the present disclosure, including the specification, drawings and exemplary embodiments thereof, can be used synonymously in certain instances, including, but not limited to, e.g., data and information. It should be understood that, while these words and/or other words that can be synonymous to one another, can be used synonymously herein, that there can be instances when such words can be intended to not be used synonymously. Further, to the extent that the prior art knowledge has not been explicitly incorporated by reference herein above, it is explicitly incorporated herein in its entirety. All publications referenced are incorporated herein by reference in their entireties. The foregoing merely illustrates the principles of the disclosure. Various modifications and alterations to the described embodiments will be apparent to those skilled in the art in view of the teachings herein. It will thus be appreciated that those skilled in the art will be able to devise numerous systems, arrangements, and procedures that, although not explicitly shown or described herein, embody the principles of the disclosure and can be thus within the spirit and scope of the disclosure. Various different exemplary embodiments can be used together with one another, as well as interchangeably therewith, as should be understood by those having ordinary skill in the art.

Example embodiments of the techniques and apparatus described herein include, but are not limited to, the following enumerated examples:

1. A method for user equipment (UE) to convey control information associated with repetitions of a data packet transmitted from the UE to a network node in a wireless communication network, the method comprising:
    transmitting, to the network node, a data packet encoded according to a particular repetition of a plurality of repetitions;
    encoding a cyclic shift (CS) of a demodulation reference signal (DMRS), based on at least one of:
        an identifier associated with the data packet; and
        a particular transmit position relative to a starting transmit position at which an initial repetition, of the plurality of repetitions, was transmitted; and
    transmitting, to the network node in association with the particular repetition of the data packet, a DMRS comprising the encoded CS.

2. The method of exemplary embodiment 1, wherein the starting transmit position, at which the initial repetition of the data packet was transmitted, comprises one of a plurality of available starting transmit positions for initial repetitions of data packets.

3. The method of exemplary embodiment 2, wherein the number of CS available for encoding is less than the plurality of available starting transmit positions.

4. The method of any of exemplary embodiments 1-3, wherein encoding the CS is based on the particular transmit position, and comprises selecting one of a plurality of available CS to represent the particular transmit position.

5. The method of exemplary embodiment 4, wherein encoding the CS comprises:
    selecting a particular sequence of CS based on the starting transmit position, each CS of the selected particular sequence corresponding to one of the plurality of repetitions; and
    selecting a particular CS from the selected particular sequence to represent the particular transmit position.

6. The method of exemplary embodiment 5, wherein the particular sequence of CS is orthogonal to further sequences of CS used to represent further ones of the available starting transmit positions.

7. The method of any of exemplary embodiments 1-3, wherein encoding the CS is based on the particular transmit position and the identifier associated with the data packet, and comprises selecting one of a plurality of available CS to represent the particular transmit position and the identifier associated with the data packet.

8. The method of embodiment 7, wherein selecting one of the plurality of available CS comprises selecting a subset of the available starting transmit positions based on the identifier associated with the data packet.

9. The method of exemplary embodiment 8, wherein the size of the subset is equal to the plurality of repetitions.

10. The method of any of exemplary embodiments 7-9, wherein selecting one of the plurality of available CS further comprises:
    selecting the starting transmit position from among the selected subset; and
    selecting one of a plurality of available sequences that corresponds to the starting transmit position, each of the plurality of available sequences comprises a first plurality of first CS values followed by a second plurality of second CS values.

11. The method of exemplary embodiment 10, wherein the difference between the first and the second pluralities of CS values is related to the starting transmit position.

12. The method of any of exemplary embodiments 10-11, wherein encoding the CS further comprises selecting a particular CS from the selected one of the plurality of available sequences to represent the particular transmit position.

13. The method of exemplary embodiment 5, further comprising transmitting the DMRS, comprising the encoded CS, independent of whether DMRS were transmitted in association with all previous repetitions of the data packet.

14. The method of any of exemplary embodiments 1-13, further comprising refraining from transmitting the DMRS if the particular transmit position is associated with a data-only subslot.

15. The method of any of exemplary embodiments 1-14, wherein the identifier associated with the data packet comprises a hybrid ARQ process identifier (HARQ ID).

16. A method for a network node, in a wireless communication network, to receive control information conveyed by a user equipment (UE) in association with repetitions of a data packet transmitted by the UE to the network node, the method comprising:
    receiving, from the UE, a plurality of repetitions of a data packet, wherein the initial repetition of the plurality is transmitted at a starting transmit position and further repetitions of the plurality are transmitted at corresponding further transmit positions;
    receiving, from the UE in association with each of at least a portion of the plurality of repetitions, a corresponding demodulation reference signal (DMRS) comprising a cyclic shift (CS); and
    determining, based on the respective CS shifts comprising the received DMRS, at least one of:
        an identifier associated with the data packet; and
        the starting transmit position at which the initial repetition was transmitted.

17. The method of exemplary embodiment 16, wherein the starting transmit position comprises one of a plurality of available starting transmit positions for initial repetitions of data packets.

18. The method of exemplary embodiment 17, wherein the number of CS available for encoding the identifier associated with the data packet and the starting transmit position is less than the plurality of available starting transmit positions.

19. The method of any of exemplary embodiments 16-18, wherein determining the starting transmit position comprises determining that the respective CS shifts comprising the received DMRS substantially match a particular CS sequence associated with the starting transmit position.

20. The method of exemplary embodiment 19, wherein the particular CS sequence is orthogonal to further CS sequences used to represent further ones of the available starting transmit positions.

21. The method of exemplary embodiment 19, wherein:
    the available starting transmit positions comprise a plurality of subsets;
    the determined starting transmit position is associated with one of the subsets; and
    the identifier associated with the data packet is determined based on which of the subsets is associated with the determined starting transmit position.

22. The method of exemplary embodiment 21, wherein the size of each subset is equal to the plurality of repetitions.
23. The method of exemplary embodiment 21, wherein the available starting transmit positions comprising a subset are associated with respective different particular CS sequences.
24. The method of exemplary embodiment 23, wherein each different particular CS sequence comprises a first plurality of first CS values followed by a second plurality of second CS values.
25. The method of exemplary embodiment 24, wherein the starting transmit position relates to the difference between the first and the second pluralities of CS values.
26. The method of any of exemplary embodiments 16-18, wherein:
  the received DMRS are associated with a subset of the plurality of repetitions; and
  determining the starting transmit position comprises determining that the respective CS shifts comprising the received DMRS substantially match a corresponding subset of a particular CS sequence associated with the starting transmit position.
27. The method of exemplary embodiment 26, wherein the subset of the plurality of repetitions excludes repetitions transmitted in data-only subslots.
28. The method of any of exemplary embodiments 16-27, wherein the identifier associated with the data packet comprises a hybrid ARQ process identifier (HARQ ID).
29. A user equipment (UE) configurable to convey control information associated with repetitions of a data packet transmitted from the UE to a network node in a wireless communication network, the UE comprising:
  communication circuitry configured for communicating with the network node; and
  processing circuitry operatively associated with the communication circuitry and configured to perform operations corresponding to the methods of any of exemplary embodiments 1-16.
30. A network node configurable to receive control information conveyed by a user equipment (UE) in association with repetitions of a data packet transmitted by the UE to the network node, the network node comprising:
  communication circuitry configured for communicating with the UE; and
  processing circuitry operatively associated with the communication circuitry and configured to perform operations corresponding to the methods of any of exemplary embodiments 17-28.
31. A non-transitory, computer-readable medium storing computer-executable instructions that, when executed by at least one processor of a user equipment (UE) configurable to convey control information associated with repetitions of a data packet transmitted from the UE to a network node in a wireless communication network, configure the UE to perform operations corresponding to the methods of any of exemplary embodiments 1-16.
32. A non-transitory, computer-readable medium storing computer-executable instructions that, when executed by at least one processor of a network node configurable to receive control information conveyed by a user equipment (UE) in association with repetitions of a data packet transmitted by the UE to the network node, configure the network node to perform operations corresponding to the methods of any of exemplary embodiments 17-28.

Notably, modifications and other embodiments of the disclosed invention(s) will come to mind to one skilled in the art having the benefit of the teachings presented in the foregoing descriptions and the associated drawings. Therefore, it is to be understood that the invention(s) is/are not to be limited to the specific embodiments disclosed and that modifications and other embodiments are intended to be included within the scope of this disclosure. Although specific terms can be employed herein, they are used in a generic and descriptive sense only and not for purposes of limitation.

The invention claimed is:
1. A method for a user equipment (UE) to transmit control information, to a network node in a wireless communication network, in association with a plurality of repetitions of a data packet, the method comprising:
  selecting, from a plurality of configured starting transmit positions, a starting transmit position for an initial repetition of the plurality of repetitions of a data packet;
  selecting a sequence of cyclic shift (CS) values from a plurality of configured CS values:
    the plurality of configured CS values being less than the plurality of configured starting transmit positions; and
    the sequence being selected based on the plurality of repetitions and
      an identifier associated with the data packet, the identifier associated with the data packet comprising a hybrid automatic repeat request processing identifier (HARQ ID); and
  transmitting the plurality of repetitions of the data packet beginning at the starting transmit position, at least a subset of the repetitions being transmitted in association with respective demodulation reference signals (DMRS) that are cyclic-shifted according to corresponding CS values of the selected sequence and phase-shifted by one of two phase-shift (PS) values.
2. The method of claim 1, wherein the starting transmit position is selected to minimize latency of the data packet.
3. The method of claim 1, wherein a number of different CS values used in the sequence is less than the plurality of configured starting transmit positions.
4. A method for a network node, in a wireless communication network, to receive control information from a user equipment (UE) in association with repetitions of a data packet, the method comprising:
  receiving, from the UE, a plurality of repetitions of a data packet, the plurality of repetitions of the data packet including an initial repetition;
  receiving, from the UE in association with at least a portion of the plurality of repetitions, respective demodulation reference signals (DMRS) that are cyclic-shifted according to a sequence of cyclic shift (CS) values and phase-shifted by one of two phase-shift (PS) values, each CS value being one of a plurality of configured CS values, and the plurality of configured CS values being less than
    a plurality of configured starting transmit positions for initial repetitions of data packets; and
  based on the sequence of CS values, determining
    an identifier associated with the data packet, the identifier associated with the data packet comprising a hybrid automatic repeat request processing identifier (HARQ ID).
5. The method of claim 4, wherein a number of different CS values used in the sequence is less than the plurality of configured starting transmit positions.
6. The method of claim 4, wherein:
  the plurality of repetitions of the data packet are received in a corresponding plurality of consecutive intervals; and each configured starting transmit position is during one of the consecutive intervals.

7. A user equipment (UE) configured to transmit control information, to a network node in a wireless communication network, in association with repetitions of a data packet transmitted by the UE, the UE comprising:
   transceiver circuitry configured for communicating with the network node; and
   processing circuitry operatively associated with the transceiver circuitry and configured to:
      select, from a plurality of configured starting transmit positions, a starting transmit position for an initial repetition of the plurality of repetitions of a data packet;
      select a sequence of cyclic shift (CS) values from a plurality of configured CS values:
         the plurality of configured CS values being less than the plurality of configured starting transmit positions; and
         the sequence being selected based on the plurality of repetitions and
            an identifier associated with the data packet, the identifier associated with the data packet comprising a hybrid automatic repeat request processing identifier (HARQ ID); and
      transmit the plurality of repetitions of the data packet beginning at the starting transmit position, at least a subset of the repetitions being transmitted in association with respective demodulation reference signals (DMRS) that are cyclic-shifted according to corresponding CS values of the selected sequence and phase-shifted by one of two phase-shift (PS) values.

8. A network node, in a wireless communication network, configured to receive control information from a user equipment (UE) in association with repetitions of a data packet transmitted by the UE, the network node comprising:
   a radio network interface configured for communicating with the UE; and
   processing circuitry operatively associated with the radio network interface and configured to:
      receive, from the UE, a plurality of repetitions of a data packet, the plurality of repetitions of the data packet including an initial repetition;
      receive, from the UE in association with at least a portion of the plurality of repetitions, respective demodulation reference signals (DMRS) that are cyclic-shifted according to a sequence of cyclic shift (CS) values and phase-shifted by one of two phase-shift (PS) values, each CS value being one of a plurality of configured CS values, and the plurality of configured CS values being less than
         a plurality of configured starting transmit positions for initial repetitions of data packets; and
      based on the sequence of CS values, determine
         an identifier associated with the data packet, the identifier associated with the data packet comprising a hybrid automatic repeat request processing identifier (HARQ ID).

9. A non-transitory computer-readable medium storing computer-executable instructions that, when executed by at least one processor of a user equipment (UE) configured to communicate with a network node in a wireless communication network, configure the UE to:
   select, from a plurality of configured starting transmit positions, a starting transmit position for an initial repetition of the plurality of repetitions of a data packet;
   select a sequence of cyclic shift (CS) values from a plurality of configured CS values:
      the plurality of configured CS values being less than the plurality of configured starting transmit positions; and
      the sequence being selected based on the plurality of repetitions and
         an identifier associated with the data packet, the identifier associated with the data packet comprising a hybrid automatic repeat request processing identifier (HARQ ID); and
   transmit the plurality of repetitions of the data packet beginning at the starting transmit position, at least a subset of the repetitions being transmitted in association with respective demodulation reference signals (DMRS) that are cyclic-shifted according to corresponding CS values of the selected sequence and phase-shifted by one of two phase-shift (PS) values.

10. A non-transitory computer-readable medium storing computer-executable instructions that, when executed by at least one processor of a network node configured to communicate with a user equipment (UE) in a wireless communication network, configure the network node to:
   receive, from the UE, a plurality of repetitions of a data packet, the plurality of repetitions of the data packet including an initial repetition;
   receive, from the UE in association with at least a portion of the plurality of repetitions, respective demodulation reference signals (DMRS) that are cyclic-shifted according to a sequence of cyclic shift (CS) values and phase-shifted by one of two phase-shift (PS) values, each CS value being one of a plurality of configured CS values, and the plurality of configured CS values being less than
      a plurality of configured starting transmit positions for initial repetitions of data packets; and
   based on the sequence of CS values, determine
      an identifier associated with the data packet, the identifier associated with the data packet comprising a hybrid automatic repeat request processing identifier (HARQ ID).

* * * * *